United States Patent
Andoni et al.

(10) Patent No.: US 11,853,893 B2
(45) Date of Patent: Dec. 26, 2023

(54) EXECUTION OF A GENETIC ALGORITHM HAVING VARIABLE EPOCH SIZE WITH SELECTIVE EXECUTION OF A TRAINING ALGORITHM

(71) Applicant: SparkCognition, Inc., Austin, TX (US)

(72) Inventors: Sari Andoni, Austin, TX (US); Keith D. Moore, Cedar Park, TX (US); Elmira M. Bonab, Austin, TX (US); Junhwan Choi, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 262 days.

(21) Appl. No.: 17/335,954

(22) Filed: Jun. 1, 2021

(65) Prior Publication Data

US 2021/0287097 A1 Sep. 16, 2021

Related U.S. Application Data

(63) Continuation of application No. 15/697,158, filed on Sep. 6, 2017, now Pat. No. 11,074,503.

(51) Int. Cl.
*G06N 3/08* (2023.01)
*G06N 3/12* (2023.01)
*G06N 3/084* (2023.01)
*G06N 3/126* (2023.01)

(52) U.S. Cl.
CPC ............ *G06N 3/084* (2013.01); *G06N 3/126* (2013.01)

(58) Field of Classification Search
CPC ...................................................... G06N 3/126
See application file for complete search history.

(56) References Cited

U.S. PATENT DOCUMENTS

| | | |
|---|---|---|
| 5,140,530 A | 8/1992 | Guha et al. |
| 6,470,261 B1 | 10/2002 | Ng et al. |
| 6,721,647 B1 | 4/2004 | Kita et al. |
| 2003/0050902 A1 | 3/2003 | Buczak et al. |

(Continued)

FOREIGN PATENT DOCUMENTS

WO 2009140160 A1 11/2009

OTHER PUBLICATIONS

Abdelaziz, Morad. "Distribution network reconfiguration using a genetic algorithm with varying population size." Electric Power Systems Research 142 (2017): 9-11. (Year: 2017).

(Continued)

*Primary Examiner* — Hal Schnee
(74) *Attorney, Agent, or Firm* — Moore IP Law

(57) ABSTRACT

A method includes generating, by a processor of a computing device, a first plurality of models (including a first number of models) based on a genetic algorithm and corresponding to a first epoch of the genetic algorithm. The method includes determining whether to modify an epoch size for the genetic algorithm during a second epoch of the genetic algorithm based on a convergence metric associated with at least one epoch that is prior to the second epoch. The second epoch is subsequent to the first epoch. The method further includes, based on determining to modify the epoch size, generating a second plurality of models (including a second number of models that is different than the first number) based on the genetic algorithm and corresponding to the second epoch. Each model of the first plurality of models and the second plurality of models includes data representative of neural networks.

23 Claims, 11 Drawing Sheets

(56) References Cited

U.S. PATENT DOCUMENTS

| | | |
|---|---|---|
| 2005/0209982 A1 | 9/2005 | Jin et al. |
| 2005/0246297 A1 | 11/2005 | Chen et al. |
| 2005/0261953 A1 | 11/2005 | Malek et al. |
| 2007/0011114 A1 | 1/2007 | Chen et al. |
| 2007/0208677 A1 | 9/2007 | Goldberg et al. |
| 2019/0073591 A1 | 3/2019 | Andoni et al. |
| 2019/0080240 A1 | 3/2019 | Andoni et al. |
| 2019/0130277 A1 | 5/2019 | Andoni et al. |
| 2019/0180181 A1 | 6/2019 | Lilley |

OTHER PUBLICATIONS

Chandra, A. et al., "Evolutionary Framework for the Construction of Diverse Hybrid Ensembles," European Symposium on Artificial Neural Networks Bruges (Belgium}, Apr. 27-29, 2005, 6 pages.

Chen, et al., "Towards Incremental Learning of Nonstationary Imbalanced Data Stream: A Multiple Selective Recursive Approach," Springer, Evolving Systems, 2011, pp. 35-50.

Fish, et al., "Using an artificial neural network trained with genetic algorithm to model brand share," Journal of Business Research 57, 2004, pp. 79-85.

Galaviz, Jose, et al., "A Self-Adaptive Genetic Algorithm for Function Optimization", IEEE, Nov. 1996, 6 pgs.

Hinterding, Robert, Zbigniew Michalewicz, and Thomas C. Peachey. "Self-adaptive genetic algorithm for numeric functions." International Conference on Parallel Problem Solving from Nature. Springer, Berlin, Heidelberg, 1996. (Year: 1996).

Jakobovic, Domagoj, et al., "Adaptive Genetic Algorithm", Journal of Computing and Information Technology, CIT 7, 1999, 3, pp. 229-235.

Kourentzes, N. et al., "Neural network ensemble operators for time series forecasting," Expert Systems with Applications 41, 2014, pp. 4235 through 4244.

Law, Nga L., et al., "Adaptive Genetic Algorithm with Mutation and Crossover Matrices," IJCAI-07, 2007, pp. 2330-2333.

Lei, Wang, et al., "An improved adaptive genetic algorithm and its application to image segmentation", Proc. SPIE 4550, Image Extraction, Segmentation, and Recognition, (Sep. 21, 2001); doi: 10.1117/12.441434; http://dx.doi.org/10.1117/12.441434, 8 pgs.

Opitz, D. et al., "Generating Accurate and Diverse Members of a Neural-Network Ensemble," Advances in Neural Information Processing Systems, 1996, pp. 535 through 541.

Pellerin, Eric, et al., "Self-adaptive parameters in genetic algorithms", Proc. SPIE 5433, Data Mining and Knowledge Discovery: Theory, Tools, and Technology VI, (Apr. 12, 2004); doi: 10.1117/12.542156; http://dx.doi.org/10.1117/12.542156, 12 pgs.

Yin, et al., "DE2: Dynamic Ensemble of Ensembles for Learning Nonstationary Data," Elsevier, Neurocomputing 165, Apr. 17, 2015, pp. 14-22.

Zhou, Z. et al., "Ensembling neural networks: Many could be better than all," Artificial Intelligence 137, 2002, pp. 239 through 263.

Input set of N models at start of epoch J
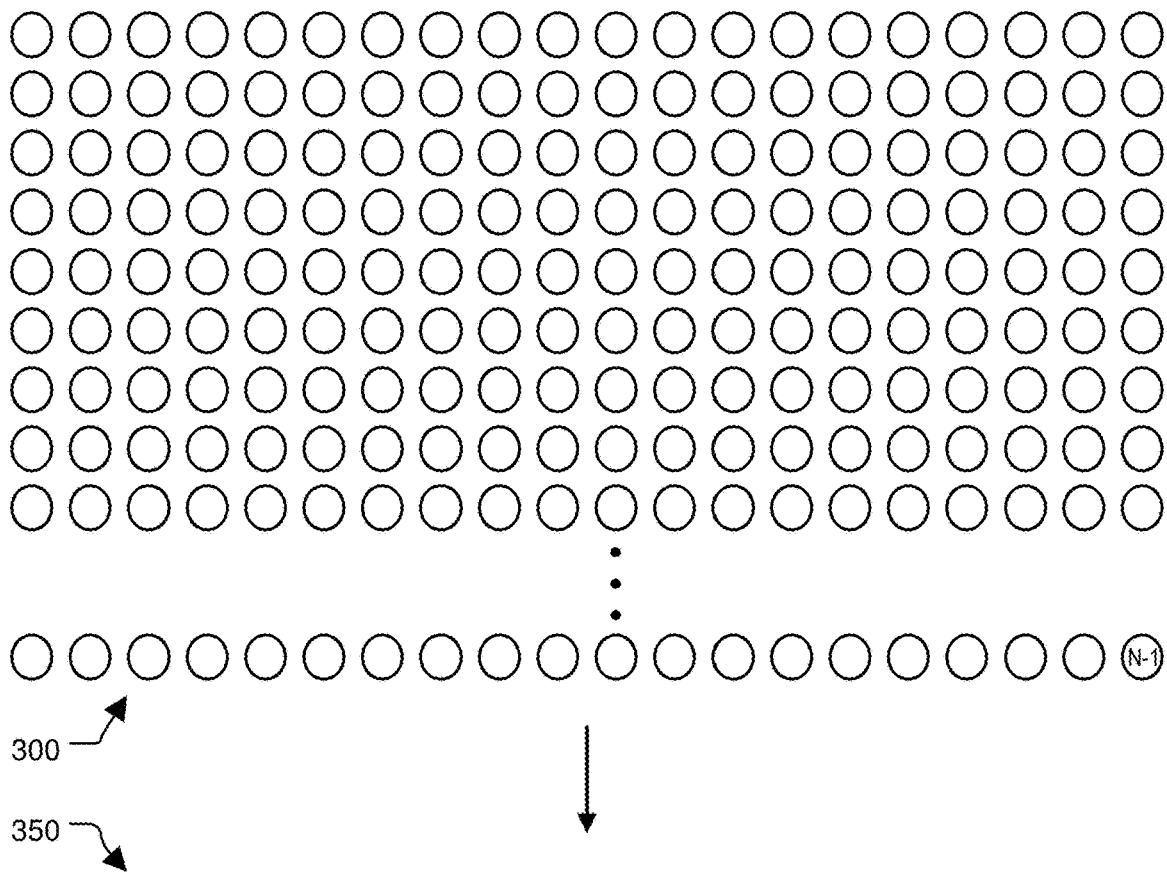
Evaluate model fitness and cluster models into species based on genetic distance
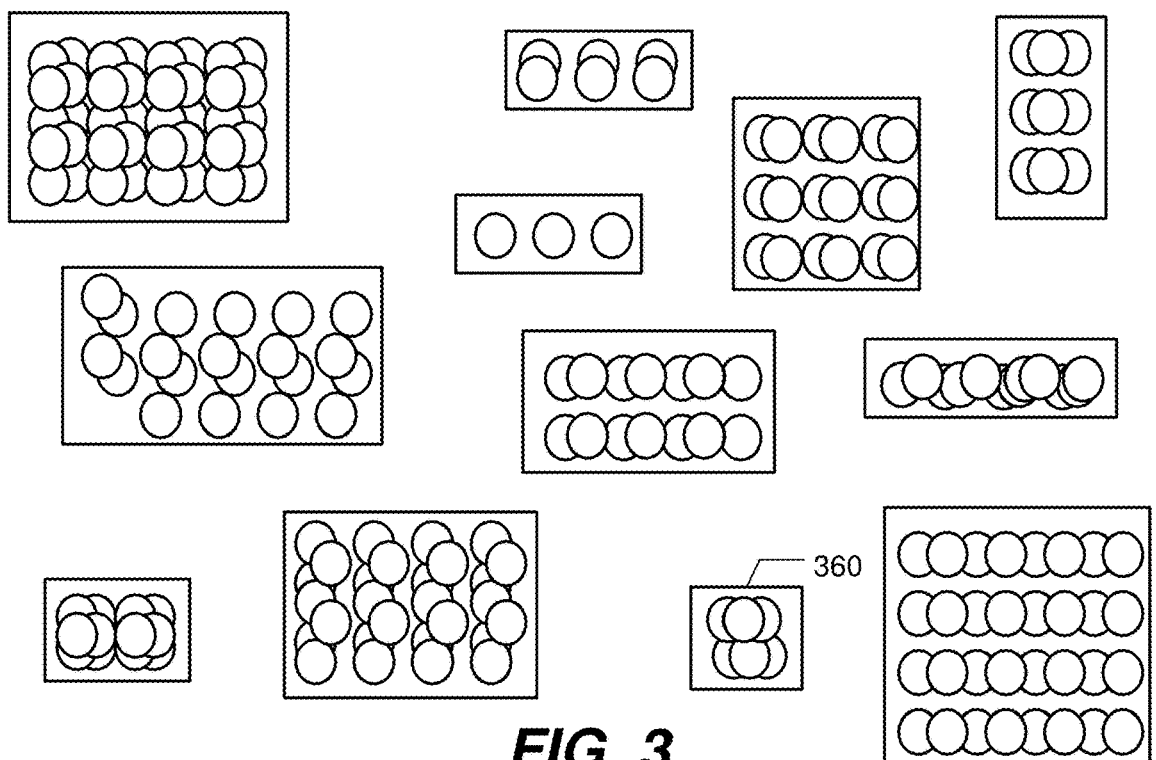
FIG. 3

Determine species fitness, identify "elite species," and remove stagnant species
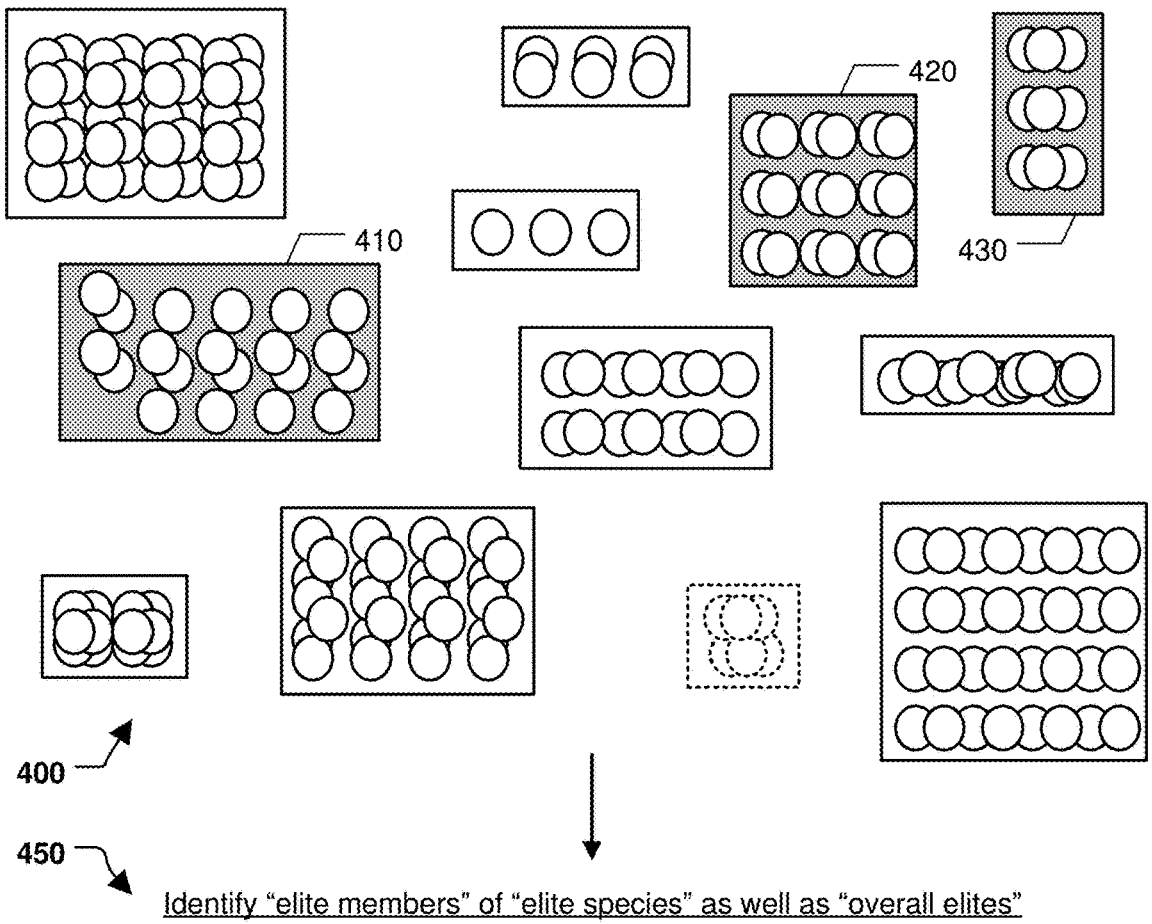
Identify "elite members" of "elite species" as well as "overall elites"
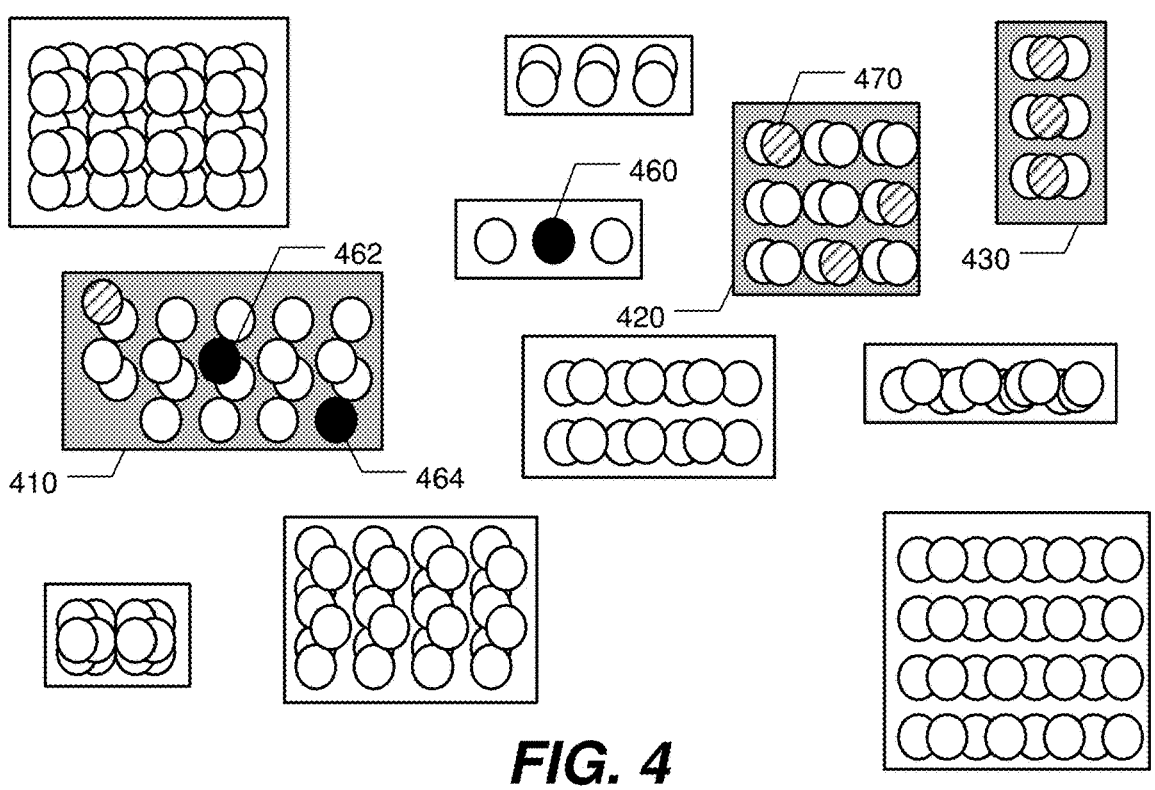
FIG. 4

900 ↘

902

Generate, by a processor of a computing device, a first plurality of models based on a genetic algorithm and corresponding to a first epoch of the genetic algorithm, where each of the first plurality of models includes data representative of a neural network, and where the first plurality of models includes a first number of models

↓

904

Determine whether to modify an epoch size during a second epoch of the genetic algorithm based on a convergence metric associated with at least one epoch that is prior to the second epoch, where the second epoch is subsequent to the first epoch

↓

906

Based on a determination to modify the epoch size, generate a second plurality of models based on the genetic algorithm and corresponding to the second epoch, where each of the second plurality of models includes data representative of a neural network, where the second plurality of models includes a second number of models, and where second number is different than the first number

*FIG. 9*

| If | Epoch Size | Number of Active Backpropagation Trainers 180 | Number of Trainable Models 122 per Epoch |
|---|---|---|---|
| 1 < epoch # ≤ 5 | 1000 | 0 | 0 |
| 5 < epoch # ≤ 10 | 200 | 0 | 0 |
| 10 < epoch # ≤ 15 | 200 | 1 | 1 |
| (15 < epoch #) & (improvement metric > 1st threshold) | 200 | Increase by 1 | Increase by 1 |
| ... | ... | ... | ... |
| (25 < epoch #) & (fitness metric > 2nd threshold) | 200 | Decrease to 0 | Decrease to 0 |

*FIG. 10*

EXECUTION OF A GENETIC ALGORITHM HAVING VARIABLE EPOCH SIZE WITH SELECTIVE EXECUTION OF A TRAINING ALGORITHM

CROSS-REFERENCE TO RELATED APPLICATIONS

The present application claims priority to and is a continuation of U.S. patent application Ser. No. 15/697,158 entitled "EXECUTION OF A GENETIC ALGORITHM HAVING VARIABLE EPOCH SIZE WITH SELECTIVE EXECUTION OF A TRAINING ALGORITHM," filed Sep. 6, 2017, the contents of which are incorporated herein by reference in their entirety.

BACKGROUND

Computers are often used to solve complex quantitative and qualitative problems. For problems that involve a large data set, a specially trained professional, known as a data scientist, is often hired. The data scientist interprets the data set and constructs models that can be processed by computers to solve the problem. However, hiring data scientists is cost prohibitive for many organizations.

For certain types of problems, advanced computing techniques, such as genetic algorithms or backpropagation, may be available to develop a model, such as a neural network, that is comparable in accuracy to a model that would be created by a data scientist. However, genetic algorithms may take a large number of iterations to converge on an acceptable neural network, and backpropagation may be slow when a large data set is being modeled or when the neural network includes a large number of nodes, connections, or layers. Additionally, backpropagation may result in "overfitting" (e.g., a neural network generated by backpropagation may model the specific data set used for training, but may not be "general" enough to model other data sets within acceptable tolerances).

Furthermore, various types of machine-learning problems exist. For example, regression problems involve evaluating a series of inputs to predict a numeric output, classification problems involve evaluating a series of inputs to predict a categorical output, and reinforcement learning involves performing actions within an environment to optimize some notion of a positive reward. Due to the differences in the various types of problems, the available mechanisms to generate and train a neural network or other machine learning solution may be problem-specific. For example, a support vector machine (SVM) may be suitable for some classification problems, linear regression may be suitable for some regression problems, and a specialized machine learning platform, such as TensorFlow, may be suitable for reinforcement learning or other numerical calculations. Although a SVM, linear regression, and specialized machine learning platforms may solve specific machine-learning problems, at least some of these mechanisms may not be particularly suited to training neural networks. Thus, generating and training neural networks that meet performance requirements for each of multiple types of problems faced by an enterprise may be slow and difficult.

SUMMARY

The present application describes automated model building systems and methods that utilize a genetic algorithm having variable epoch sizes and selective backpropagation to generate and train a neural network in a manner that is applicable to multiple types of machine-learning problems. To illustrate, the described automated model building techniques may enable a generalized approach to generating neural networks that can be applied for regression, classification, and reinforcement learning problems. Combining a genetic algorithm having variable epoch sizes with selective backpropagation (e.g., based on fitness of the results of the backpropagation or some other criteria) as described herein may enable generating a neural network that models a particular data set with acceptable accuracy and in less time than using genetic algorithms having a fixed epoch size or backpropagation alone.

As an illustrative, non-limiting example, consider a home with four temperature sensors that periodically collect temperature readings in the living room (L), the dining room (D), the master bedroom (M), and the guest bedroom (G), respectively. In this example, a data set may include four columns, where each column corresponds to temperature readings from a particular sensor in a particular room, and where each row corresponds to a particular time at which the four sensors took a temperature reading. It may be of interest to predict the temperature in one of the rooms, e.g., L, given the temperature in the other three rooms, e.g., D, M, and G. A neural network may be suitable for such a problem, where the neural network has D, M, and/or G as input nodes and L as an output node. For example, a neural network that predicts an output value of L with 90% accuracy given input values of D, M, and/or G may be an acceptable solution.

In accordance with the described techniques, a combination of a genetic algorithm having variable epoch size and selective use of an optimization algorithm such as backpropagation, a derivative free optimizer (DFO), an extreme learning machine (ELM) or similar optimizer may be used to generate and then train a neural network. For example, early epochs of a genetic algorithm may generate a large number of models having relatively simple topologies in order to identify one or more "good" topologies, and the later epochs may generate fewer models and use backpropagation or another optimization trainer in order to tune at least some of the models. It is to be understood that characterization of any system components of method steps as "optimizers" or "optimization trainers," and use of such terminology herein, is not to be interpreted as requiring such components or steps to generate optimal results to the extreme (e.g., 100% prediction or classification accuracy). Rather, use of such terms is to be interpreted as indicating an attempt generate an output that is improved in some fashion relative to an input. For example, an optimization trainer that receives a trainable model as input and outputs a trained model may attempt to improve a prediction or classification accuracy of the trainable model by modifying one or more attributes of the trainable model to generate the trained model. Genetic algorithms are iterative adaptive search heuristics inspired by biological natural selection. The genetic algorithm may start with a population of random models that each define a neural network with different topology, weights and activation functions. Over the course of several epochs (also known as generations), the models may be evolved using biology-inspired reproduction operations, such as crossover (e.g., combining characteristics of two neural networks), mutation (e.g., randomly modifying a characteristic of a neural network), stagnation/extinction (e.g., removing neural networks whose accuracy has not improved in several epochs), and selection (e.g., identifying the best performing neural networks via testing). In addition, the best performing models of an epoch may be selected for reproduction to generate a trainable model. The trainable model may be trained using backpropagation to generate a trained model. When the trained model is available, the trained model may be re-inserted into the genetic algorithm for continued evolution. Training a model that is generated by breeding the best performing population members of an epoch may serve to reinforce desired "genetic traits" (e.g., neural network topology, activation functions, connection weights, etc.), and introducing the trained model back into the genetic algorithm may lead the genetic algorithm to converge to an acceptably accurate solution (e.g., neural network) faster, for example because desired "genetic traits" are available for inheritance in later epochs of the genetic algorithm. Additionally, if a fitness of the trained model fails to satisfy a threshold (e.g., the accuracy of the trained model is not sufficiently improved to justify the increased usage of processing resources to perform the training), a different model (e.g., from a previous epoch) may be provided for training or training may be suspended for one or more epochs to conserve processing resources until a later epoch, when models that are better suited for training may be generated.

A computer system in accordance with the present disclosure may include a memory that stores an input data set. The computer system may also include at least one processor that is configured to execute a recursive search. For example, the recursive search may be a genetic algorithm to generate a neural network that best models the input data set. During the recursive search, the processor may generate a first plurality of data structures during a first iteration of the recursive search. For example, each data structure may be a model of a neural network that models at least a portion of the input data set. The processor may generate a second plurality of data structures based on at least one of the first plurality of data structures during a second iteration of the recursive search. The second plurality of data structures includes a different number of data structures than the first plurality of data structures. For example, the first plurality of data structures may include a first number of data structures and the second plurality of data structures may include a second number of data structures that is different than the first number. The processor may further provide a trainable data structure to an optimization trainer that is configured to train the trainable data structure based on a portion of the input data set to generate a trained structure and to provide the trained data structure as input to a third iteration of the recursive search that is subsequent to the second iteration. The trainable data structure may be determined based on modifying one or more data structures of the second plurality of data structures. For example, the processor may perform one or more crossover operations, one or more mutation operations, or a combination thereof, based on a subset of the second plurality of data structures that is selected based on respective fitness values.

BRIEF DESCRIPTION OF THE DRAWINGS

FIG. 3 illustrates particular examples of first and second stages of operation at the system of FIG. 1;

FIG. 4 illustrates particular examples of third and fourth stages of operation at the system of FIG. 1;

FIG. 9 illustrates a particular example of a method of execution of a genetic algorithm having variable epoch size; and FIG. 10 illustrates a particular example of rules for changing an epoch size of a genetic algorithm.

DETAILED DESCRIPTION

Figure 1:
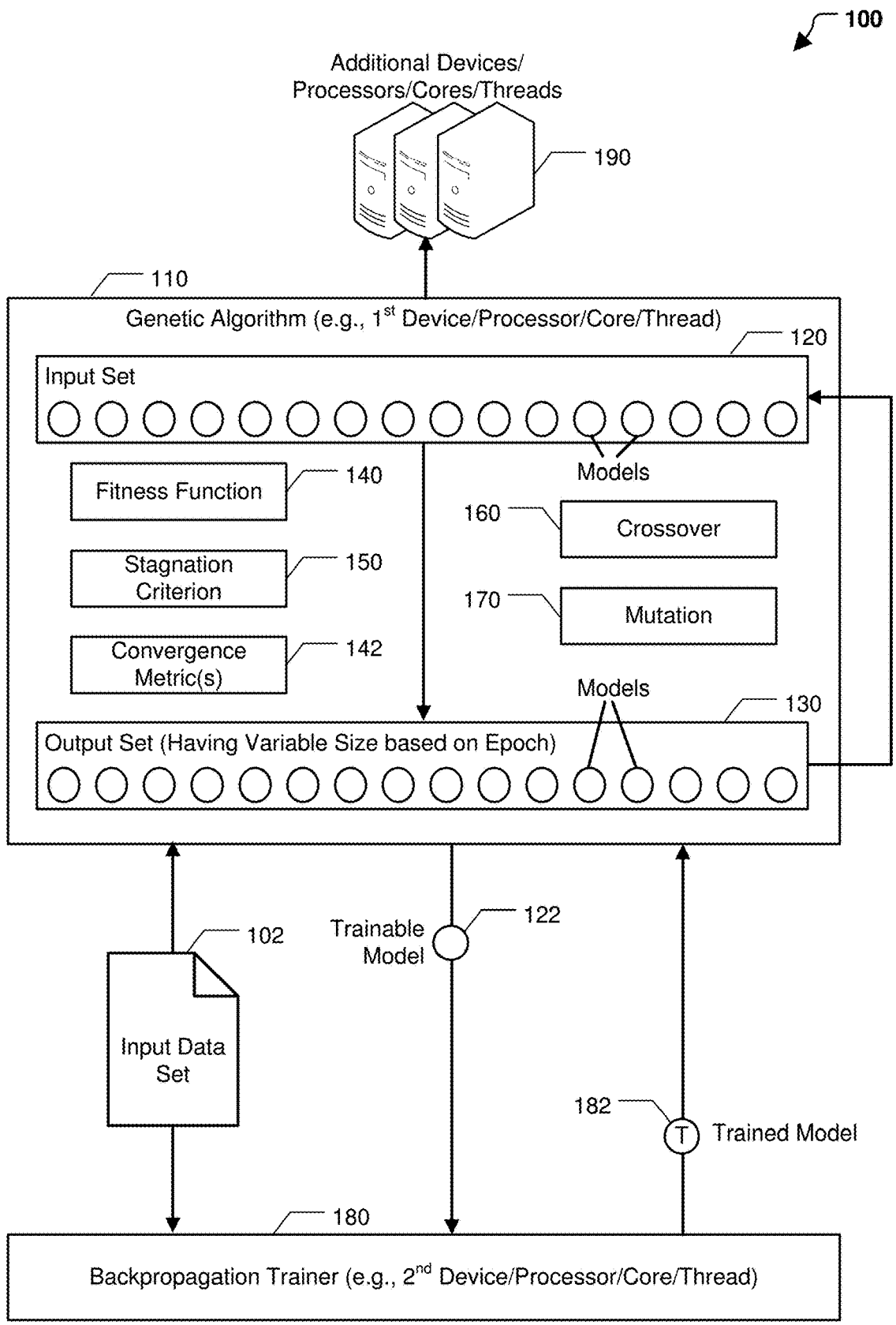
FIG. 1 illustrates a particular example of a system that is operable to support cooperative execution of a genetic algorithm and a backpropagation trainer.

Referring to FIG. 1, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a genetic algorithm 110 and a backpropagation trainer 180. The backpropagation trainer 180 is an example of an optimization trainer, and other examples of optimization trainers that may be used in conjunction with the described techniques include, but are not limited to, a derivative free optimizer (DFO), an extreme learning machine (ELM), etc.

It is to be understood that operations described herein as being performed by the genetic algorithm 110 or the backpropagation trainer 180 may be performed by a device executing the genetic algorithm 110 or the backpropagation trainer 180. In particular aspects, the genetic algorithm 110 is executed on a different device, processor (e.g., central processor unit (CPU), graphics processing unit (GPU) or other type of processor), processor core, and/or thread (e.g., hardware or software thread) than the backpropagation trainer 180. Moreover, execution of certain operations associated with the genetic algorithm 110 or the backpropagation trainer 180 may be parallelized, as further described herein.

The genetic algorithm 110 may automatically generate a neural network model of a particular data set, such as an illustrative input data set 102. The system 100 may provide an automated model building process that enables even inexperienced users to quickly and easily build highly accurate models based on a specified data set. Additionally, the system 100 may simplify the neural network model to avoid overfitting and to reduce computing resources required to run the model. Additionally, input sets and/or output sets of different epochs of the genetic algorithm 110 may have different sizes to provide a balance between increasing a speed with which the system 100 converges to a result having an acceptable accuracy and processing resources used by the system 100 during the convergence. Changing the size of the input sets and/or the output sets based on how effective new topologies or species of models are may also improve the efficiency of the system 100 by adding additional models having topologies or traits associated with improvements in fitness and by decreasing the amount of models generated or evolved when the topologies or traits are not associated with sufficient improvements in fitness, which may improve the quality (e.g., fitness) of models output by the model building process. Additionally, varying the size of the input sets and/or the output sets may optimize the search space for effective new topologies or traits. Additionally, the system 100 may conserve processing resources and reduce power consumption by selectively disabling the backpropagation trainer 180 in situations in which the backpropagation trainer 180 does not (or has not been or is not expected to) provide significant improvement to the convergence of the genetic algorithm 110.

The genetic algorithm 110 includes or is otherwise associated with a fitness function 140, a stagnation criterion 150, a crossover operation 160, and a mutation operation 170. As described above, the genetic algorithm 110 may represent a recursive neuroevolutionary search process. During each iteration of the search process (also called an "epoch" or a "generation" of the genetic algorithm 110), an input set (or population) 120 may be "evolved" to generate an output set (or population) 130. The input set 120 of an initial epoch of the genetic algorithm 110 may be randomly or pseudo-randomly generated. After that, the output set 130 of one epoch may be the input set 120 of the next (non-initial) epoch, as further described herein. The input set 120 of some epochs has a different size than the input set 120 of other epochs (and the input set 120 may have a different size than the output set 130 for some epochs), as further described herein.

The input set 120 and the output set 130 may each include a plurality of models, where each model includes data representative of a neural network. For example, each model may specify a neural network by at least a neural network topology, a series of activation functions, and connection weights. The topology of a neural network may include a configuration of nodes of the neural network and connections between such nodes. The models may also be specified to include other parameters, including but not limited to bias values/functions and aggregation functions.

Figure 2:
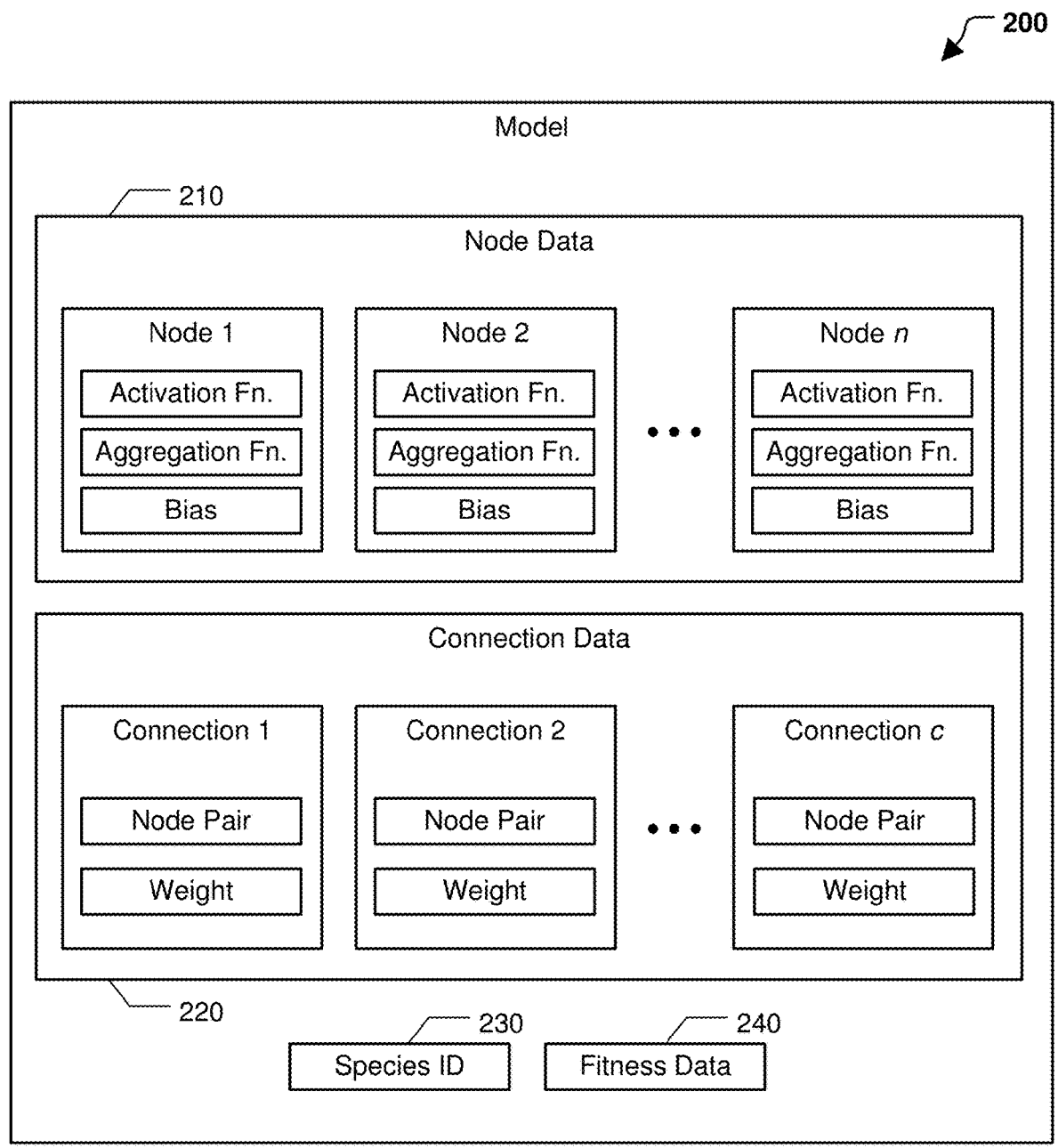
FIG. 2 illustrates a particular example of a model including data representative of a neural network.

Additional examples of neural network models are further described with reference to FIG. 2. In particular, as shown in FIG. 2, a model 200 may be a data structure that includes node data 210 and connection data 220. In the illustrated example, the node data 210 for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or other type of mathematical function that represents a threshold at which the node is activated. The biological analog to activation of a node is the firing of a neuron. The aggregation function may be a mathematical function that combines (e.g., sum, product, etc.) input signals to the node. An output of the aggregation function may be used as input to the activation function. The bias may be a constant value or function that is used by the aggregation function and/or the activation function to make the node more or less likely to be activated.

The connection data 220 for each connection in a neural network may include at least one of a node pair or a connection weight. For example, if a neural network includes a connection from node N1 to node N2, then the connection data 220 for that connection may include the node pair <N1, N2>. The connection weight may be a numerical quantity that influences if and/or how the output of N1 is modified before being input at N2. In the example of a recurrent network, a node may have a connection to itself (e.g., the connection data 220 may include the node pair <N1, N1>).

The model 200 may also include a species identifier (ID) 230 and fitness data 240. The species ID 230 may indicate which of a plurality of species the model 200 is classified in, as further described with reference to FIG. 3. The fitness data 240 may indicate how well the model 200 models the input data set 102. For example, the fitness data 240 may include a fitness value that is determined based on evaluating the fitness function 140 with respect to the model 200, as further described herein.

Returning to FIG. 1, the fitness function 140 may be an objective function that can be used to compare the models of the input set 120. In some examples, the fitness function 140 is based on a frequency and/or magnitude of errors produced by testing a model on the input data set 102. As a simple example, assume the input data set 102 includes ten rows, that the input data set 102 includes two columns denoted A and B, and that the models illustrated in FIG. 1 represent neural networks that output a predicted a value of B given an input value of A. In this example, testing a model may include inputting each of the ten values of A from the input data set 102, comparing the predicted values of B to the corresponding actual values of B from the input data set 102, and determining if and/or by how much the two predicted and actual values of B differ. To illustrate, if a particular neural network correctly predicted the value of B for nine of the ten rows, then a relatively simple fitness function (e.g., the fitness function 140) may assign the corresponding model a fitness value of $9/10=0.9$. It is to be understood that the previous example is for illustration only and is not to be considered limiting. In some aspects, the fitness function 140 may be based on factors unrelated to error frequency or error rate, such as number of input nodes, node layers, hidden layers, connections, computational complexity, etc.

In a particular aspect, fitness evaluation of models may be performed in parallel. To illustrate, the system 100 may include additional devices, processors, cores, and/or threads 190 to those that execute the genetic algorithm 110 and the backpropagation trainer 180. These additional devices, processors, cores, and/or threads 190 may test model fitness in parallel based on the input data set 102 and may provide the resulting fitness values to the genetic algorithm 110.

In a particular aspect, the genetic algorithm 110 may be configured to perform speciation. For example, the genetic algorithm 110 may be configured to cluster the models of the input set 120 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 110 may be configured to serialize a model into a bit string. In this example, the genetic distance between models may be represented by the number of differing bits in the bit strings corresponding to the models. The bit strings corresponding to models may be referred to as "encodings" of the models. Speciation is further described with reference to FIG. 3.

Because the genetic algorithm 110 is configured to mimic biological evolution and principles of natural selection, it may be possible for a species of models to become "extinct." The stagnation criterion 150 may be used to determine when a species should become extinct, e.g., when the models in the species are to be removed from the genetic algorithm 110. Stagnation is further described with reference to FIG. 4.

The crossover operation 160 and the mutation operation 170 is highly stochastic under certain constraints and a defined set of probabilities optimized for model building, which produces reproduction operations that can be used to generate the output set 130, or at least a portion thereof, from the input set 120. In a particular aspect, the genetic algorithm 110 utilizes intra-species reproduction but not inter-species reproduction in generating the output set 130. Including intra-species reproduction and excluding inter-species reproduction may be based on the assumption that because they share more genetic traits, the models of a species are more likely to cooperate and will therefore more quickly converge on a sufficiently accurate neural network. In some examples, inter-species reproduction may be used in addition to or instead of intra-species reproduction to generate the output set 130. Crossover and mutation are further described with reference to FIG. 6.

Left alone and given time to execute enough epochs, the genetic algorithm 110 may be capable of generating a model (and by extension, a neural network) that meets desired accuracy requirements. However, because genetic algorithms utilize randomized selection, it may be overly time-consuming for a genetic algorithm to arrive at an acceptable neural network. To illustrate, it may be possible for the "traits" of an unreliable neural network to survive for several epochs of the genetic algorithm 110, which may delay convergence of the genetic algorithm 110 on a reliable and accurate neural network that models the input data set 102. In accordance with the present disclosure, to "help" the genetic algorithm 110 arrive at a solution faster, sizes of the input set 120 and the output set 130 may vary for different epochs. For example, the input set 120 (and the output set 130) of a first epoch may include a first number of models (N), and the input set 120 (and the output set 130) of a second epoch that is subsequent to the first epoch may include a second number of models (M). The second number is different than the first number (e.g., N and M are different positive integers). The number of models generated in each epoch may be determined based on a convergence metric associated with one or more previous epochs. The convergence metric may include an epoch number, a fitness-based metric, an improvement metric, a stagnation metric, or some other metric based on one or more models of the one or more previous epochs, as further described herein. In a particular aspect, earlier epochs may generate and evolve a large number of models in order to rapidly identify one or more "promising" neural network topologies that achieve better fitness, and later epochs may generate smaller numbers of models (e.g., N is greater than M) to tune characteristics of the "promising" neural network topologies. To illustrate, the first five epochs may each generate and/or evolve 1000 models, and subsequent epochs may each generate and/or evolve 200 models. Reducing the number of models generated and/or evolved in later epochs may result in similar or improved results using fewer processing resources as compared to generating and/or evolving the same number of models for each epoch. Additionally, or alternatively, reducing the number of models generated and/or evolved in particular epochs may cause traits that are associated with more successful models to be propagated to the output of the genetic algorithm 110, which may improve the fitness of the output of the genetic algorithm 110. Additional details regarding variable epoch sizes are further described herein.

Additionally, to "help" the genetic algorithm 110 arrive at a solution faster, a model may occasionally be sent from the genetic algorithm 110 to the backpropagation trainer 180 for training. This model is referred to herein as a trainable model 122. In particular, the trainable model 122 may be based on crossing over and/or mutating the fittest models of the input set 120, as further described with reference to FIG. 5. Thus, the trainable model 122 may not merely be a genetically "trained" file produced by the genetic algorithm 110. Rather, the trainable model 122 may represent an advancement with respect to the fittest models of the input set 120.

The backpropagation trainer 180 may utilize a portion, but not all of the input data set 102 to train the connection weights of the trainable model 122, thereby generating a trained model 182. For example, the portion of the input data set 102 may be input into the trainable model 122, which may in turn generate output data. The input data set 102 and the output data may be used to determine an error value, and the error value may be used to modify connection weights of the model, such as by using gradient descent or another function.

The backpropagation trainer 180 may train using a portion rather than all of the input data set 102 to mitigate overfitting concerns and/or to shorten training time. The backpropagation trainer 180 may leave aspects of the trainable model 122 other than connection weights (e.g., neural network topology, activation functions, etc.) unchanged. Backpropagating a portion of the input data set 102 through the trainable model 122 may serve to positively reinforce "genetic traits" of the fittest models in the input set 120 that were used to generate the trainable model 122. Because the backpropagation trainer 180 may be executed on a different device, processor, core, and/or thread than the genetic algorithm 110, the genetic algorithm 110 may continue executing additional epoch(s) while the connection weights of the trainable model 122 are being trained. When training is complete, the trained model 182 may be input back into (a subsequent epoch of) the genetic algorithm 110, so that the positively reinforced "genetic traits" of the trained model 182 are available to be inherited by other models in the genetic algorithm 110.

In some aspects, the backpropagation trainer 180 may be selectively disabled (e.g., "turned off") for one or more epochs of the genetic algorithm 110. During epochs in which the backpropagation trainer 180 is disabled, trainable models are not generated and provided to the backpropagation trainer 180. The backpropagation trainer 180 may be turned off (e.g., disabled) based on a convergence metric, such as a fitness of the trained model 182 generated by the backpropagation trainer 180. For example, the fitness function 140 may be applied to the trained model 182 to generate a fitness value, and if the fitness value fails to satisfy a threshold (or if a difference between the fitness value and a fitness value associated with the trainable model 122 fails to satisfy the threshold), backpropagation training may be disabled for Y epochs (e.g., trained models may not be generated and provided to the backpropagation trainer 180 until Y epochs have passed, where Y is any positive integer). As a non-limiting example, the system 100 may refrain from generating and providing trained models to the backpropagation trainer 180 for five epochs (e.g., the backpropagation trainer 180 is turned off for five epochs). As used herein, a value satisfies a threshold when the value is greater than or equal to a threshold value. In other aspects, a value may satisfy a threshold when the value is greater than (e.g., exceeds) the threshold value, when the value is less than (e.g., fails to exceed) the threshold value, or is less than or equal to the threshold value. After Y epochs are completed (e.g., elapsed), the trainable model 122 may be generated based on the current epoch and provided to the backpropagation trainer 180. Backpropagation training may be selectively enabled for one or more epochs based on a fitness value associated with the trained model 182 generated after Y epochs are completed. Thus, the backpropagation trainer 180 may be used to train models in situations in which the trained models represent sufficient improvements (as compared to outputs of the genetic algorithm 110) to compensate for the increased power consumption and usage of processing resources by the backpropagation trainer 180. In some implementations, operation of the genetic algorithm 110 (e.g., generation and/or evolution of models during one or more epochs) may be suspended until results of the backpropagation trainer 180 are available as inputs to a particular epoch of the genetic algorithm 110.

Operation of the system 100 is now described with reference to FIGS. 3-7. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 102 and may specify a particular data field or a set of data fields in the input data set 102 to be modeled. The data field(s) to be modeled may correspond to output nodes of a neural network that is to be generated by the system 100. For example, if a user indicates that the value of a particular data field is to be modeled (e.g., to predict the value based on other data of the data set), the model may be generated by the system 100 to include an output node that generates an output value corresponding to a modeled value of the particular data field. In particular implementations, the user can also configure other aspects of the model. For example, the user may provide input to indicate a particular data field of the data set that is to be included in the model or a particular data field of the data set that is to be omitted from the model. As another example, the user may provide input to constrain allowed model topologies. To illustrate, the model may be constrained to include no more than a specified number of input nodes, no more than a specified number of hidden layers, or no recurrent loops.

Further, in particular implementations, the user can configure aspects of the genetic algorithm 110. For example, the user may provide input to limit a number of epochs that will be executed by the genetic algorithm 110. Alternatively, the user may specify a time limit indicating an amount of time that the genetic algorithm 110 has to generate the model, and the genetic algorithm 110 may determine a number of epochs that will be executed based on the specified time limit. To illustrate, an initial epoch of the genetic algorithm 110 may be timed (e.g., using a hardware or software timer at the computing device executing the genetic algorithm 110), and a total number of epochs that are to be executed within the specified time limit may be determined accordingly. As another example, the user may constrain a number of models evaluated in each epoch, for example by constraining the size of the input set 120 and/or the output set 130. As another example, the user may constrain the number of models evaluated in different epochs. For example, the user may set the size of the input set 120 and/or the output set 130 to be N for a first set of epochs, and the user may set the size of the input set 120 and/or the output set 130 to be M for a second set of epochs, where N and M are different integers. As another example, the user may set a threshold for one or more metrics that are used to vary the number of models generated during one or more epochs of the genetic algorithm 110. As another example, the user can define a number of trainable models 122 to be trained by the backpropagation trainer 180 and fed back into the genetic algorithm 110 as trained models 182. As yet another example, the user can define a threshold fitness to be used to enable (or disable) the backpropagation trainer 180.

In particular aspects, configuration of the genetic algorithm 110 also includes performing pre-processing steps based on the input data set 102. For example, the system 100 may determine, based on the input data set 102 and/or user input, whether a neural network is to be generated for a regression problem, a classification problem, a reinforcement learning problem, etc. As another example, the input data set 102 may be "cleaned" to remove obvious errors, fill in data "blanks," etc. As another example, values in the input data set 102 may be scaled (e.g., to values between 0 and 1). As yet another example, non-numerical data (e.g., categorical classification data or Boolean data) may be converted into numerical data.

After the above-described configuration stage, the genetic algorithm 110 may automatically generate an initial set of models based on the input data set 102, received user input indicating (or usable to determine) the type of problem to be solved, etc. (e.g., the initial set of models is data-driven). As illustrated in FIG. 2, each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes.

The initial set of models may be input into an initial epoch of the genetic algorithm 110 as the input set 120, and at the end of the initial epoch, the output set 130 generated during the initial epoch may become the input set 120 of the next epoch of the genetic algorithm 110. In some aspects, the input set 120 may include a first number of models (N) during a first set of epochs that includes the initial epoch. The first number of models N may be different than a second number of models (M) that are included in the input set 120 during a second set of epochs that are subsequent to the first set of epochs, as further described herein. In some examples, the input set 120 may have a specific number of models. For example, as shown in a first stage 300 of operation in FIG. 3, the input set may include 1000 models (e.g., N equals 1000). It is to be understood that alternative examples may include a different number of models in the input set 120 and/or the output set 130 for the first set of epochs. The first set of epochs may include one or more epochs including the initial epoch. For example, the first set of epochs may include five epochs, as a non-limiting example. To illustrate, in a particular implementation, the first five epochs of the genetic algorithm 110 may receive 1000 models as inputs, and later epochs (e.g., the sixth epoch or later) may receive a different number of models as inputs, as further described herein. Although described in the context of the initial epoch, the description corresponding to FIG. 3 may correspond to any epoch J included in the first set of epochs.

For the initial epoch of the genetic algorithm 110, the topologies of the models in the input set 120 may be randomly or pseudo-randomly generated within constraints specified by any previously input configuration settings. Accordingly, the input set 120 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model may have a second topology, including a second number of input nodes associated with a second set of data parameters, a second number of hidden layers including a second number and arrangement of hidden nodes, one or more output nodes, and a second set of interconnections between the nodes. Since the first model and the second model are both attempting to model the same data field(s), the first and second models have the same output nodes.

The genetic algorithm 110 may automatically assign an activation function, an aggregation function, a bias, connection weights, etc. to each model of the input set 120 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node the particular model. Aggregation functions may similarly be randomly or pseudo-randomly assigned for the models in the input set 120 of the initial epoch. Thus, the models of the input set 120 of the initial epoch may have different topologies (which may include different input nodes corresponding to different input data fields if the data set includes many data fields) and different connection weights. Further, the models of the input set 120 of the initial epoch may include nodes having different activation functions, aggregation functions, and/or bias values/functions.

Continuing to a second stage 350 of operation, each model of the input set 120 may be tested based on the input data set 102 to determine model fitness. For example, the input data set 102 may be provided as input data to each model, which processes the input data set (according to the network topology, connection weights, activation function, etc., of the respective model) to generate output data. The output data of each model may be evaluated using the fitness function 140 to determine how well the model modeled the input data set 102. For example, in the case of a regression problem, the output data may be evaluated by comparing a prediction value in the output data to an actual value in the input data set 102. As another example, in the case of a classification problem, a classifier result indicated by the output data may be compared to a classification associated with the input data set 102 to determine if the classifier result matches the classification in the input data set 102. As yet another example, in the case of a reinforcement learning problem, a reward may be determined (e.g., calculated) based on evaluation of an environment, which may include one or more variables, functions, etc. In a reinforcement learning problem, the fitness function 140 may be the same as or may be based on the reward function(s). Fitness of a model may be evaluated based on performance (e.g., accuracy) of the model, complexity (or sparsity) of the model, or a combination thereof. As a simple example, in the case of a regression problem or reinforcement learning problem, a fitness value may be assigned to a particular model based on an error value associated with the output data of that model or based on the value of the reward function, respectively. As another example, in the case of a classification problem, the fitness value may be assigned based on whether a classification determined by a particular model is a correct classification, or how many correct or incorrect classifications were determined by the model.

In a more complex example, the fitness value may be assigned to a particular model based on both prediction/classification accuracy or reward optimization as well as complexity (or sparsity) of the model. As an illustrative example, a first model may model the data set well (e.g., may generate output data or an output classification with a relatively small error, or may generate a large positive reward function value) using five input nodes (corresponding to five input data fields), whereas a second potential model may also model the data set well using two input nodes (corresponding to two input data fields). In this illustrative example, the second model may be sparser (depending on the configuration of hidden nodes of each network model) and therefore may be assigned a higher fitness value that the first model.

As shown in FIG. 3, the second stage 350 may include clustering the models into species based on genetic distance. In a particular aspect, the species ID 230 of each of the models may be set to a value corresponding to the species that the model has been clustered into.

Continuing to FIG. 4, during a third stage 400 and a fourth stage 450 of operation, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 110 may maintain a data structure that tracks the fitness of each species across multiple epochs. Based on the species fitness, the genetic algorithm 110 may identify the "fittest" species, shaded and denoted in FIG. 4 as "elite species." Although three elite species 410, 420, and 430 are shown in FIG. 4, it is to be understood that in alternate examples a different number of elite species may be identified.

In a particular aspect, the genetic algorithm 110 uses species fitness to determine if a species has become stagnant and is therefore to become extinct. As an illustrative non-limiting example, the stagnation criterion 150 may indicate that a species has become stagnant if the fitness of that species remains within a particular range (e.g., +/−5%) for a particular number (e.g., 5) epochs. If a species satisfies a stagnation criterion, the species and all underlying models may be removed from the genetic algorithm 110. In the illustrated example, species 360 of FIG. 3 is removed, as shown in the third stage 400 through the use of broken lines.

Proceeding to the fourth stage 450, the fittest models of each "elite species" may be identified. The fittest models overall may also be identified. In the illustrated example, the three fittest models of each "elite species" are denoted "elite members" and shown using a hatch pattern. Thus, model 470 is an "elite member" of the "elite species" 420. The three fittest models overall are denoted "overall elites" and are shown using black circles. Thus, models 460, 462, and 464 are the "overall elites" in the illustrated example. As shown in FIG. 4 with respect to the model 460, an "overall elite" need not be an "elite member," e.g., may come from a non-elite species. In an alternate implementation, a different number of "elite members" per species and/or a different number of "overall elites" may be identified.

Figure 5:
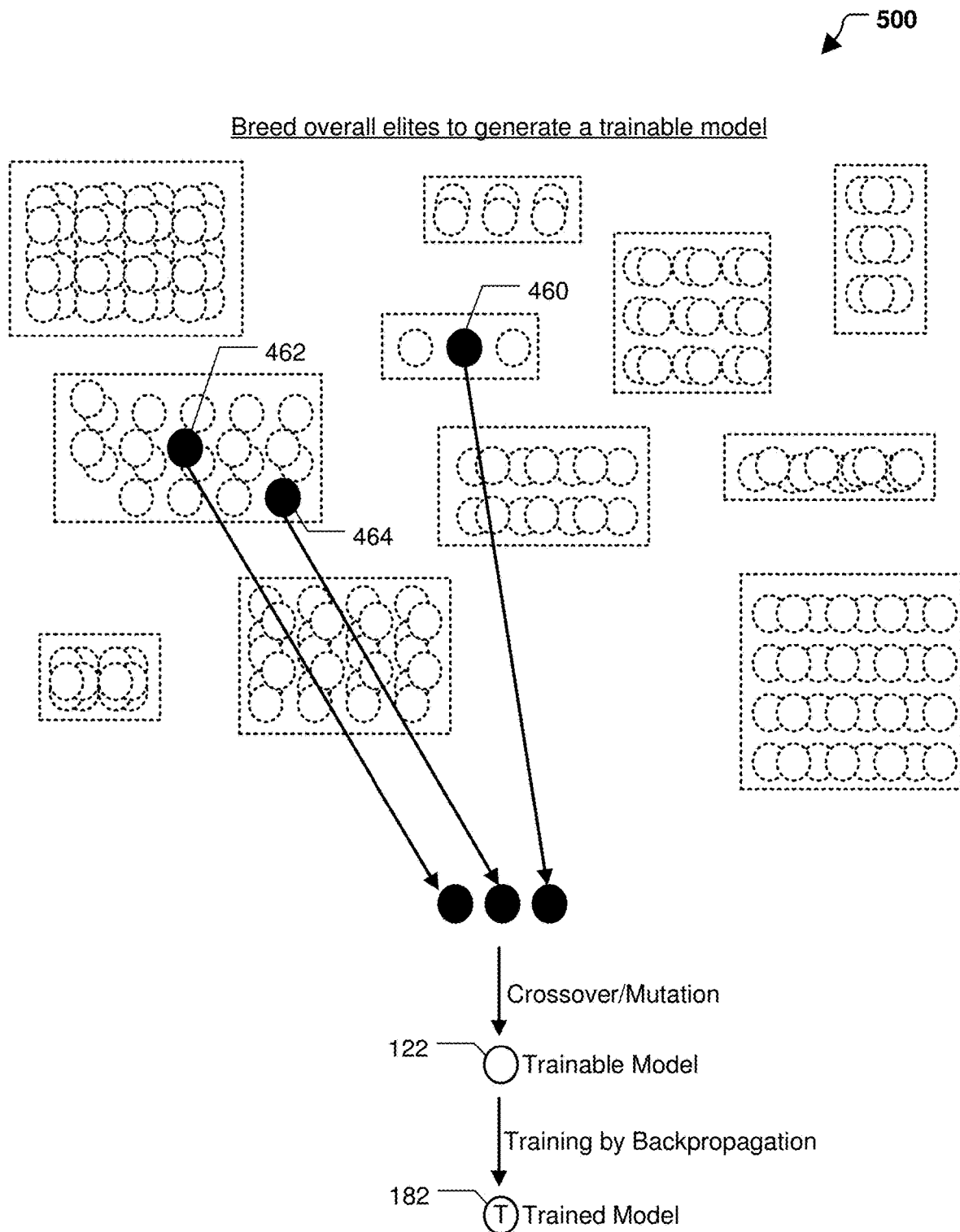
FIG. 5 illustrates a particular example of a fifth stage of operation at the system of FIG. 1.

Referring now to FIG. 5, during a fifth stage 500 of operation, the "overall elite" models 460, 462, and 464 may be genetically combined to generate the trainable model 122. For example, genetically combining models may include crossover operations in which a portion of one model is added to a portion of another model, as further illustrated in FIG. 6. As another example, a random mutation may be performed on a portion of one or more of the "overall elite" models 460, 462, 464 and/or the trainable model 122. The trainable model 122 may be sent to the backpropagation trainer 180, as described with reference to FIG. 1. The backpropagation trainer 180 may train connection weights of the trainable model 122 based on a portion of the input data set 102. When training is complete, the resulting trained model 182 may be received from the backpropagation trainer 180 and may be input into a subsequent epoch of the genetic algorithm 110. Although described with respect to the initial epoch, in other implementations, the trainable model 122 is not generated and provided to the backpropagation trainer 180 until a later epoch. For example, the trainable model 122 may not be generated and provided to the backpropagation trainer 180 until one of the second set of epochs (that have a different, e.g., reduced, epoch size), or an epoch that is subsequent to the second set of epochs. In these implementations, the backpropagation trainer 180 is said to be "disabled" until the later epochs. Alternatively, the trainable model 122 may be generated and provided to the backpropagation trainer 180 during one of the first set of epochs. In these implementations, the backpropagation trainer 180 is said to be "enabled" during the earlier epochs.

Figure 6:
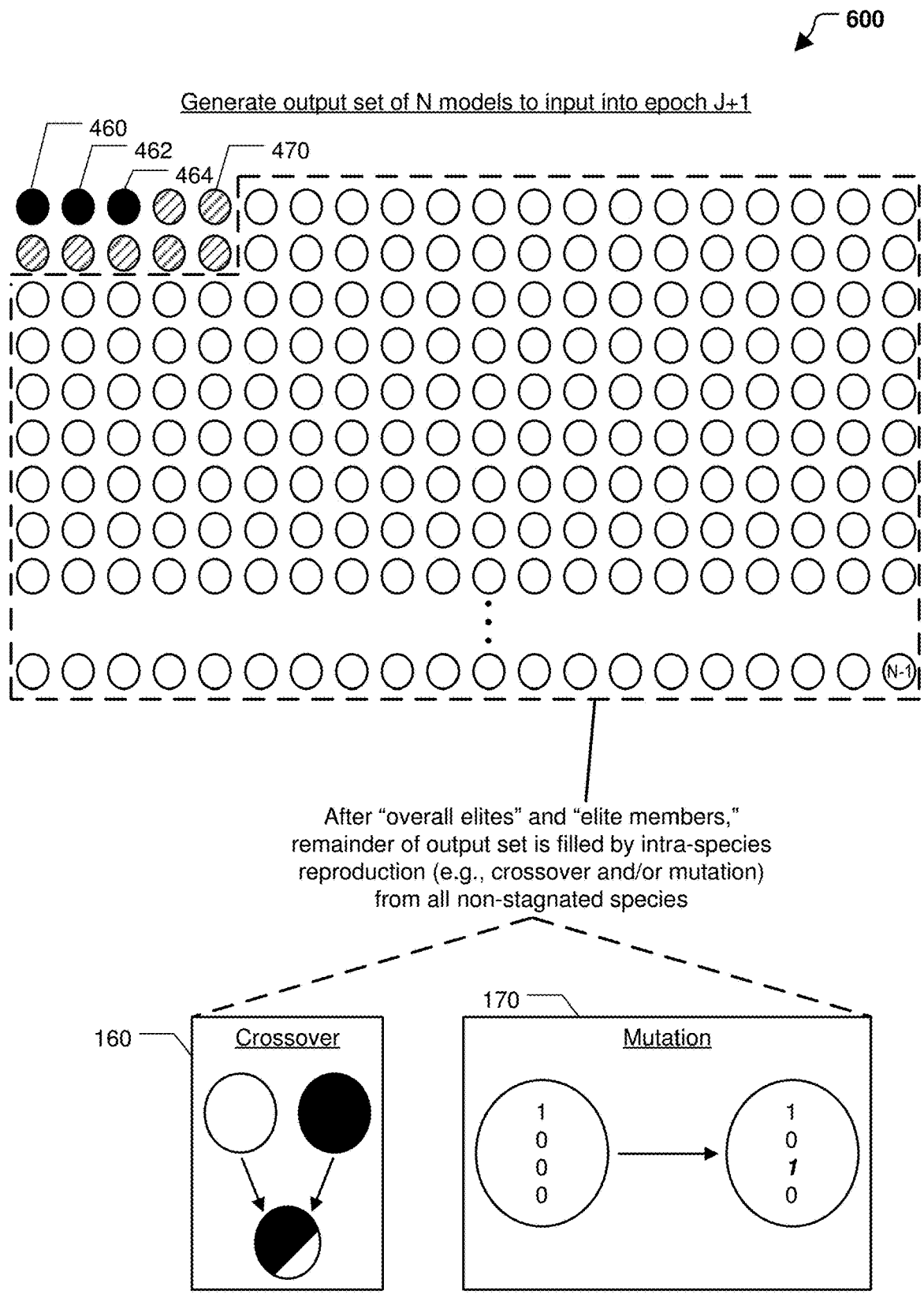
FIG. 6 illustrates a particular example of a sixth stage of operation at the system of FIG. 1.

Continuing to FIG. 6, while the backpropagation trainer 180 trains the trainable model, the output set 130 of the epoch may be generated in a sixth stage 600 of operation. In the illustrated example, the output set 130 includes the same number of models, e.g., 1000 models, as the input set 120. The output set 130 may include each of the "overall elite" models 460-464. The output set 130 may also include each of the "elite member" models, including the model 470. Propagating the "overall elite" and "elite member" models to the next epoch may preserve the "genetic traits" that resulted in such models being assigned high fitness values.

The rest of the output set 130 may be filled out by random intra-species reproduction using the crossover operation 160 and/or the mutation operation 170. In the illustrated example, the output set 130 includes 10 "overall elite" and "elite member" models, so the remaining 990 models may be randomly generated based on intra-species reproduction using the crossover operation 160 and/or the mutation operation 170. After the output set 130 is generated, the output set 130 may be provided as the input set 120 for the next epoch of the genetic algorithm 110.

During the crossover operation 160, a portion of one model may be combined with a portion of another model, where the size of the respective portions may or may not be equal. To illustrate with reference to the model "encodings" described with respect to FIG. 1, the crossover operation 160 may include concatenating bits 0 to p of one bit string with bits p+1 to q of another bit string, where p and q are integers and p+q is equal to the total size of a bit string that represents a model resulting from the crossover operation 160. When decoded, the resulting bit string after the crossover operation 160 produces a neural network that differs from each of its "parent" neural networks in terms of topology, activation function, aggregation function, bias value/function, link weight, or any combination thereof.

Thus, the crossover operation 160 may be a random or pseudo-random biological operator that generates a model of the output set 130 by combining aspects of a first model of the input set 120 with aspects of one or more other models of the input set 120. For example, the crossover operation 160 may retain a topology of hidden nodes of a first model of the input set 120 but connect input nodes of a second model of the input set 120 to the hidden nodes. As another example, the crossover operation 160 may retain the topology of the first model of the input set 120 but use one or more activation functions of the second model of the input set 120. In some aspects, rather than operating on models of the input set 120, the crossover operation 160 may be performed on a model (or models) generated by mutation of one or more models of the input set 120. For example, the mutation operation 170 may be performed on a first model of the input set 120 to generate an intermediate model and the crossover operation 160 may be performed to combine aspects of the intermediate model with aspects of a second model of the input set 120 to generate a model of the output set 130.

During the mutation operation 170, a portion of a model may be randomly modified. The frequency of mutations may be based on a mutation probability metric, which may be user-defined or randomly selected/adjusted. To illustrate with reference to the model "encodings" described with respect to FIG. 1, the mutation operation 170 may include randomly "flipping" one or more bits a bit string.

The mutation operation 170 may thus be a random or pseudo-random biological operator that generates or contributes to a model of the output set 130 by mutating any aspect of a model of the input set 120. For example, the mutation operation 170 may cause the topology a particular model of the input set to be modified by addition or omission of one or more input nodes, by addition or omission of one or more connections, by addition or omission of one or more hidden nodes, or a combination thereof. As another example, the mutation operation 170 may cause one or more activation functions, aggregation functions, bias values/functions, and/or or connection weights to be modified. In some aspects, rather than operating on a model of the input set 120, the mutation operation 170 may be performed on a model generated by the crossover operation 160. For example, the crossover operation 160 may combine aspects of two models of the input set 120 to generate an intermediate model and the mutation operation 170 may be performed on the intermediate model to generate a model of the output set 130.

The genetic algorithm 110 may continue in the manner described above through multiple epochs. When the genetic algorithm 110 receives the trained model 182, the trained model 182 may be provided as part of the input set 120 of a Kth epoch, as shown in a seventh stage 700 of FIG. 7. For example, the trained model 182 may replace one of the other models in the input set 120. During training by the backpropagation trainer 180, the genetic algorithm 110 may have advanced one or more epochs (e.g., X epochs, where X is any integer greater than 0). Thus, when the trained model 182 is received, the trained model 182 may be inserted as input into an epoch subsequent to the epoch during which the corresponding trainable model 122 was provided to the backpropagation trainer 180. To illustrate, if the trainable model 122 was provided to the backpropagation trainer 180 during epoch J, then the trained model 182 may be input into epoch K, where K=J+X.

Figure 7:
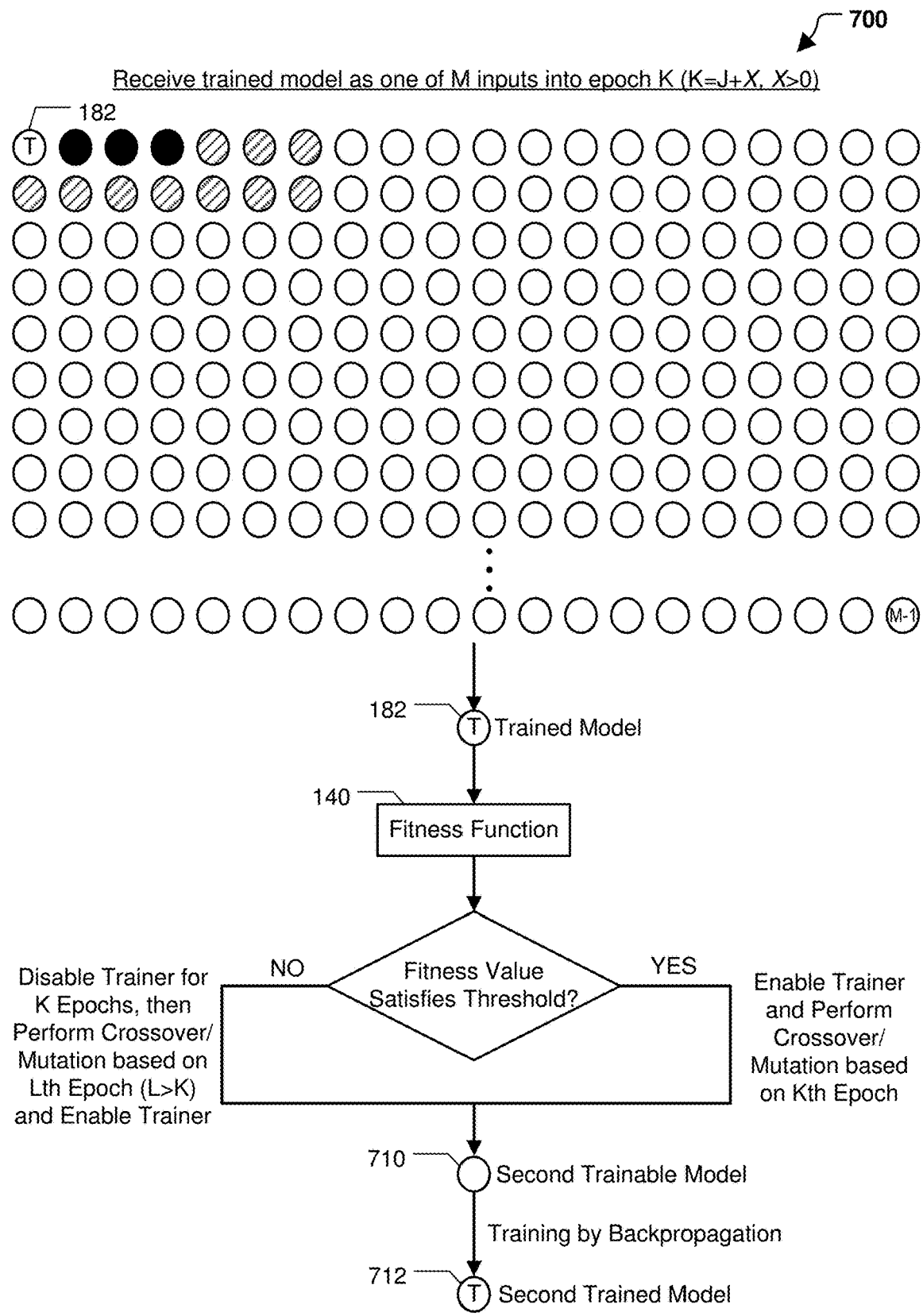
FIG. 7 illustrates a particular example of a seventh stage of operation at the system of FIG. 1.

In the example of FIGS. 5 and 7, a single trainable model 122 is provided to the backpropagation trainer 180 and a single trained model 182 is received from the backpropagation trainer 180. When the trained model 182 is received, the backpropagation trainer 180 becomes available to train another trainable model. Thus, because training takes more than one epoch, trained models 182 may be input into the genetic algorithm 110 sporadically rather than every epoch after the initial epoch. In some implementations, the backpropagation trainer 180 may have a queue or stack of trainable models 122 that are awaiting training. The genetic algorithm 110 may add trainable models 122 to the queue or stack as they are generated and the backpropagation trainer 180 may remove a trainable model 122 from the queue or stack at the start of a training cycle. In some implementations, the system 100 includes multiple backpropagation trainers 180 (e.g., executing on different devices, processors, cores, or threads). Each of the backpropagation trainers 180 may be configured to simultaneously train a different trainable model 122 to generate a different trained model 182. In such examples, more than one trainable model 122 may be generated during an epoch and/or more than one trained model 182 may be input into an epoch.

The Kth epoch may be included in a second set of epochs having a second number of models (M) for the input set 120 (as compared to the first number of models N). M and N may be any different positive integers such that the second set of epochs is associated with a different number of models as the input set 120 and/or the output set 130 than the first set of epochs. In some implementations, M is less than N. Using more models in early epochs of the genetic algorithm 110 and using fewer models in later (e.g., subsequent) epochs of the genetic algorithm 110 may enable identification of one or more simple models having higher accuracy than other simple models during the early epochs (e.g., the first set of epochs) and may enable tuning of the identified models to efficiently identify characteristics of the models that increase accuracy during the later epochs (e.g., the second set of epochs). In other implementations, N is less than M.

The system 100 may determine to modify an epoch size during a particular epoch of the genetic algorithm 110 based on a convergence metric 142 associated with at least one epoch prior to the particular epoch. To modify the epoch size (e.g., the number of models in the input set 120 and/or the output set 130) for different epochs of the genetic algorithm 110, in some implementations, at least one epoch has a different number of models in the output set 130 than in the input set 120. For example, for the last epoch of the first set of epochs, the input set 120 may include N models, and the output set 130 may include M models. To illustrate, during a particular epoch at the end of the first set of epochs, the genetic algorithm 110 may output a different number of models than are received as inputs (e.g., M models may be output when N models are received as input). The output models may include the "overall elite" models 460-464, the "elite member" models, including the model 470, and the rest of the models may be filled out by random reproduction. In the particular epoch, fewer models may be generated by random reproduction than in previous epochs. Alternatively, the input set 120 and the output set 130 may be the same size for each epoch, and only a subset of the output set 130 of the particular epoch is provided as the input set 120 to the next epoch (e.g., the first epoch of the second set of epochs). For example, the models having the highest fitness values may be selected for propagation to the next set of epochs, as a non-limiting example. In other examples, other criteria are used to select the subset of the output set 130.

The determination to modify the epoch size may be based on the convergence metric 142 associated with at least one epoch prior to the particular epoch. In some implementations, the convergence metric 142 includes an epoch number of the particular epoch. For example, a first set of epochs (e.g., corresponding to a first epoch number range) may be associated with a first size and a second set of epochs (e.g., corresponding to a second epoch number range) may be associated with a second size. Although two sets of epochs are described, in other implementations, more than two sets of epochs may be associated with different sizes. As a particular, non-limiting example, each epoch may be assigned a respective size for the input set 120 and/or the output set 130. During a particular epoch, the system 100 determines the number of models to be included in the input set 120 and/or the output set 130 (e.g., the epoch size) based on the epoch number of the particular epoch. For example, if the epoch number is included in the first epoch number range, the input set 120 and/or the output set 130 may include N models, and if the epoch number is in the second epoch number range, the input set 120 and/or the output set 130 may include M models. The association of epoch number(s) to epoch size(s) may be indicated by configuration data. For example, the configuration data may be stored at a memory of the system 100 (e.g., during initialization of the genetic algorithm 110 or during updating of the genetic algorithm 110) or based on user input.

In other implementations, the convergence metric 142 includes one or more metrics based on at least one prior epoch or at least one model of the at least one prior epoch. For example, during an epoch of the genetic algorithm 110, the system 100 may determine to generate the same number of models as during a prior epoch (e.g., not to modify the epoch size), to generate more models than during the prior epoch (e.g., to increase the epoch size), or to generate fewer models than during the prior epoch (e.g., to decrease the epoch size) based on the convergence metric 142. The convergence metric 142 may include a fitness value corresponding to at least one model generated during at least one prior epoch, an improvement metric corresponding to the at least one model generated during at least one prior epoch, a stagnation metric corresponding to the at least one prior epoch, other metrics, or any combination thereof. The at least one prior epoch may be the immediately prior epoch or the particular epoch and the at least one prior epoch may be separated by one or more epochs.

As an example, a fitness value may be determined based on models generated by a prior epoch. The fitness value may include an average fitness value, a highest fitness value, a median fitness value, a most common fitness value, or another fitness value. If the fitness value satisfies a first fitness threshold, the system 100 may determine to reduce the epoch size as compared to prior epochs. Reducing the epoch size may efficiently use processing resources to tune the generated models. If the fitness value fails to satisfy the first threshold but satisfies a second threshold, the system 100 may determine to maintain the epoch size (e.g., to generate the same number of models as the prior epoch). For example, if the fitness value is between the first threshold and the second threshold, the genetic algorithm 110 may be producing acceptable results for the amount of processing resources used by the system 100. If the fitness value fails to satisfy both the first and second thresholds, the system 100 may determine to increase the epoch size as compared to the prior epoch. Increasing the epoch size increases the chance that a model will be generated that can be tuned to enable the genetic algorithm 110 to converge to an acceptable result.

As another example, the system 100 may determine whether to modify the epoch size based on an improvement metric. The improvement metric may indicate a change in fitness or accuracy from a first prior epoch to a second prior epoch. The improvement metric may be based on fitness values, average fitness values, highest fitness values, media fitness values, most common fitness values, etc., of the two prior epochs. As an illustrative, non-limiting example, the improvement metric may indicate a change (e.g., %) between the average (or highest) fitness value for two different epochs. If the improvement metric satisfies a threshold, the system 100 may determine to maintain the same epoch size (or reduce the epoch size) during the current epoch. For example, if the improvement metric satisfies the threshold, the genetic algorithm 110 may be producing acceptable results during the prior epoch, and therefore no changes are to be made. However, if the improvement metric fails to satisfy the threshold, the epoch size may be increased (as compared to the prior epoch) to provide additional models that may offer one or more traits that improve quality of the output of the current epoch or subsequent epochs.

As yet another example, the system 100 may determine the epoch size based on a stagnation metric. The stagnation metric may indicate that the models generated by the genetic algorithm 110 have become stagnant. As an illustrative non-limiting example, the stagnation metric may indicate that output of the prior epoch has become stagnant if the average (or highest) fitness for a particular number (e.g., 5) epochs remains within a particular range (e.g., +/−5%). If the stagnation metric satisfies a threshold, the system 100 may determine to increase the epoch size for the current epoch as compared to a prior epoch. For example, if the stagnation metric satisfies the threshold, the number of models generated during the current epoch may be increased in order to introduce additional models with additional/different traits to attempt to overcome the stagnation. However, if the stagnation metric fails to satisfy the threshold, the epoch size may remain constant (or be decreased) as compared to the prior epoch, as the outputs of the prior epochs may be acceptable and therefore no change is to be made (or the number of models that are generated is reduced to reduce use of processing resources and power consumption). In other examples, the system 100 may determine the epoch size (or change the epoch size) based on other metrics or factors.

Any of the above-described metrics or thresholds may be based on pre-set values. For example, the metrics and/or thresholds may be stored at a memory of the system 100, such as during initialization or updating of the genetic algorithm 110. Alternatively, any of the metrics and/or thresholds may be based on user input.

In addition to varying the epoch size for different epochs, the backpropagation trainer 180 may be used to further improve the convergence of the genetic algorithm 110. However, operation of the backpropagation trainer 180 may use non-negligible processing resources. Thus, the system 100 uses increased processing resources (and has increased power consumption) if the backpropagation trainer 180 is used (or if multiple instances of the backpropagation trainer 180 are used). In some situations, use of the backpropagation trainer 180 may be inefficient. For example, for simple neural networks, the backpropagation trainer 180 may not provide significant improvement in accuracy as compared to performing one or more genetic operations as part of an epoch of the genetic algorithm 110. Thus, in some situations, use of the backpropagation trainer 180 may significantly increase power consumption without providing significant benefits to the convergence of the genetic algorithm 110.

In order to efficiently use processing resources at the system 100, in some implementations, the backpropagation trainer 180 may be selectively disabled to reduce usage processing resources in situations in which the trained model 182 does not model the input set 120 with sufficient accuracy. For example, the backpropagation trainer 180 may be selectively enabled or disabled for another epoch based on the convergence metric 142 or another metric, such as a fitness value associated with the trained model 182. To illustrate, the fitness function 140 may be applied to the trained model 182 to generate a fitness value. For example, the fitness value may represent an accuracy of the trained model 182 in modelling at least a portion of the input set 120. The fitness value may be compared to a threshold to determine whether to enable the backpropagation trainer 180 or to disable the backpropagation trainer 180 by refraining from generating and providing trainable models for at least one epoch. Additionally or alternatively, the convergence metric 142 may include a difference between the fitness value associated with the trained model 182 and a fitness value associated with the trainable model 122 (e.g., an improvement metric), and the difference may be compared to a threshold to determine whether to enable or disable the backpropagation trainer 180.

If the convergence value satisfies a first threshold, a second trainable model 710 may be generated by modifying (e.g., performing one or more crossover operations or one or more mutation operations) one or more models generated by the Kth epoch of the genetic algorithm 110. The first threshold may represent a minimum fitness (e.g., accuracy) value for enabling the backpropagation trainer 180. If the fitness value fails to satisfy the first threshold, the backpropagation trainer 180 may be disabled for Y epochs, where Y is any positive integer. For example, during the Y epochs, the trainable model 122 is not generated and provided to the backpropagation trainer 180. As a non-limiting example, if the fitness value fails to satisfy the first threshold, the backpropagation trainer 180 may be disabled for the next five epochs. After the Y epochs have elapsed, the backpropagation trainer 180 may be enabled. For example, the second trainable model 710 may be generated by modifying one or more models generated by an Lth epoch of the genetic algorithm 110, where L=K+Y.

The second trainable model 710 may be provided to the backpropagation trainer 180 (during or after the Kth epoch or the Lth epoch) for training to generate a second trained model 712. The second trained model 712 may be provided as an input to a subsequent epoch of the genetic algorithm 110. Additionally, the second trained model 712 may be used to determine whether to enable the backpropagation trainer 180 for the subsequent epoch. In this manner, the backpropagation trainer 180 may be selectively disabled when the trained model 182 (or the second trained model 712) does not significantly improve accuracy as compared to one or more operations of the genetic algorithm 110 in order to reduce power consumption and use of processing resources by the system 100.

In a particular implementation, a determination whether to enable the backpropagation trainer 180 is made after each trained model 182 is generated. For example, each time the trained model 182 is generated by the backpropagation trainer 180, a fitness value (or other convergence metric) associated with the trained model 182 is compared to the first threshold, and if the fitness value (or other convergence metric) satisfies the first threshold, the backpropagation trainer 180 is enabled for another epoch. Alternatively, the backpropagation trainer 180 may be enabled for multiple epochs based on the trained model 182. For example, in response to the convergence metric 142 satisfying the first threshold, the backpropagation trainer 180 may be enabled for a particular number (e.g., 5) epochs. After generating and providing the trainable model 122 to the backpropagation trainer 180, another determination whether to enable the backpropagation trainer may be made.

The convergence metric 142 used to determine whether to enable or to disable the backpropagation trainer 180 may be based on the trained model 182 or may include another metric that is associated with at least one prior epoch or at least one model of at least one prior epoch. In some implementations, the same convergence metric 142 that is used to determine whether to vary the epoch size may also be used to determine whether to enable or disable the backpropagation trainer 180. As a particular example, the convergence metric 142 may include an epoch number. To illustrate, a first set of epochs within a first epoch number range may be associated with no backpropagation training, a second set of epochs within a second epoch number range may be associated with backpropagation training, and the determination whether to enable or disable the backpropagation trainer 180 for a particular epoch may be based on whether the epoch number of the particular epoch is within the first epoch number range or the second epoch number range. For example, the first set of epochs may include the first 5, 10, 15, or another number of epochs, and backpropagation training may be disabled during the first set of epochs because the models generated or evolved during those epochs may not be sufficiently complex such for backpropagation training to provide significant improvement.

In some implementations, the convergence metric 142 may include one or more other values associated with at least one prior epoch or at least one model associated with the at least one prior epoch. As a particular example, the convergence metric 142 may include or correspond to a fitness value. To illustrate, if a fitness value (e.g., an average fitness value, a highest fitness value, etc.) associated with at least one model of the at least one prior metric fails to satisfy a threshold, the backpropagation trainer 180 may be enabled for one or more subsequent epochs to "help" the genetic algorithm 110 converge faster. As another example, the convergence metric 142 may include an improvement metric, a stagnation metric, or another metric based on at least one model of the at least one prior epoch. To illustrate, if an improvement metric (e.g., a difference between fitness values associated with models of two different prior epochs) satisfies a threshold, the backpropagation trainer 180 may be disabled for one or more subsequent epochs to reduce power consumption and to conserve processing resources.

In some implementations, the convergence metric 142 may be based on the trained model 182. For example, the convergence metric 142 may include a fitness value, an improvement metric, a stagnation metric, etc., based on one or more trained models 182. To illustrate, if a fitness value associated with the trained model 182 is less than a fitness value associated with a trained model from a prior epoch (e.g., the backpropagation trainer 180 is generating less accurate or less improved trained models during a particular epoch than during prior epochs), the backpropagation trainer 180 may be disabled for one or more subsequent epochs to reduce power consumption and to conserve processing resources. In some implementations, multiple convergence metrics may be generated (e.g., based on the trained model 182, one or more models of one or more prior epochs, or both) and compared to multiple thresholds to determine whether to enable or disable the backpropagation trainer 180.

In some implementations, the backpropagation trainer 180 may be enabled (or disabled) based on the epoch size. For example, if the epoch size of a particular epoch is greater than or equal to a particular size (e.g., 500, 1000, etc.), the backpropagation trainer 180 may be disabled for the particular epoch. Disabling one or more instances of the backpropagation trainer 180 may enable processing resources and/or memory resources (e.g., a memory footprint) that are allocated to the one or more instances of the backpropagation trainer 180 to be reallocated to other operations, thereby improving the efficiency of the system 100. Alternatively, if the epoch size is less than the particular size, the backpropagation trainer 180 may be enabled for the particular epoch. In this manner, the epoch size and use of the backpropagation trainer 180 may be related to perform automatic resource balancing.

In another particular implementation, multiple trainable models may be provided to the backpropagation trainer 180 in some situations. For example, if the convergence metric 142 satisfies the first threshold and satisfies a second threshold, a particular number (e.g., 2, 5, or 10, as non-limiting examples) of trainable models may be generated and provided to the backpropagation trainer 180 (or to multiple instances of the backpropagation trainer 180) during a subsequent epoch of the genetic algorithm 110. For example, multiple backpropagation trainers 180 may be executed (e.g., on different devices, processors, cores, or threads), and more than one backpropagation trainer 180 may be enabled, such that trainable models 122 are generated and provided to the more than one backpropagation trainer 180 for training, when the fitness value (or another metric, such as an improvement metric) satisfy the first threshold and the second threshold. Additionally or alternatively, the backpropagation trainer 180 (or multiple instances of the backpropagation trainer 180) may have a queue or stack of trainable models 122 that are awaiting training, and based on the fitness value (or other metric) satisfying the first threshold and the second threshold, multiple trainable models 122 may be added to the queue or stack. In this manner, in situations in which the backpropagation trainer 180 is providing significant improvements (e.g., when both the first threshold and the second threshold are satisfied), multiple trainable models may be provided to the backpropagation trainer 180 (or to additional backpropagation trainers 180) to "help" the genetic algorithm 110 to converge faster. In some examples, the number of enabled/instantiated/active backpropagation trainers 180 in the system 100 is represented by B, where B is an integer greater than or equal to zero, and where B can vary from epoch to epoch based on the value of various metrics, such as the convergence metric 142, an improvement metric, etc. In some implementations, operations of the genetic algorithm 110 may be suspended until the backpropagation trainers 180 generate the trained models to be used as inputs into the next epoch of the genetic algorithm 110. Alternatively, operations of the genetic algorithm 110 (e.g., generation and/or evolution of models during one or more epochs) may continue during the backpropagation training, and the outputs of the backpropagation trainers 180 may be included as inputs to a subsequent epoch of the genetic algorithm 110.

Thus, varying the number of models generated during different epochs of the genetic algorithm 110, selectively using the backpropagation trainer 180, and varying the number of the trainable models 122 that are generated (and the number of backpropagation trainers 180 that are enabled) may enable efficient usage of processing resources while causing the genetic algorithm 110 to converge faster than using the genetic algorithm 110 or the backpropagation trainer 180 separately. In some implementations, the same metrics may be used to determine the epoch size, the number of backpropagation trainers 180 to enable, and the number of the trainable models 122 that are generated and provided to the backpropagation trainer(s) 180. Alternatively, the epoch size, the number of backpropagation trainers 180 to enable, and the number of the trainable models 122 that are generated and provided to the backpropagation trainer(s) 180 may each be determined based on different metrics.

As a particular non-limiting example, FIG. 10 illustrates stored rules 1002 indicating that 1000 models are generated during each of epochs 1-5 of the genetic algorithm 110 and the backpropagation trainer 180 is disabled during the first five epochs. During each of epochs 6-10, 200 models are generated and the backpropagation trainer 180 remains disabled. During each of epochs 11-15, 200 models are generated and the backpropagation trainer 180 is enabled (e.g., a single trained model 122 is generated and provided to the backpropagation trainer 180). In this example, the first five epochs generate a larger number of models (e.g., 1000) having a simple topology to attempt to identify one or more simple topologies with higher accuracy than the others. During the next five epochs, a smaller number of models (e.g., 200) are tuned using genetic operations to increase the complexity and improve the accuracy of the models. After the tenth epoch, the models may have sufficient complexity such that backpropagation training can provide significant improvement, so the backpropagation trainer 180 is enabled for epochs 11-15. Additional rules may also trigger changes in epoch size, number of active optimization trainers, and number of trainable models generated and provided for optimization training per epoch, as shown in FIG. 10.

Thus, processing and memory resources may be used efficiently by varying the number of models generated during different epochs, by disabling the backpropagation trainer 180 until epochs which generate models that can be significantly improved by the backpropagation trainer 180, by varying the number of trainable models generated per epoch, etc. In this manner, storage of the stored rules 1002 (e.g., at a memory of the system 100) enables improved performance of the system 100 by decreasing execution time of the genetic algorithm 110, decreased power consumption associated with executing the genetic algorithm 110, efficient usage of processing and memory resources (e.g., selective reallocation of processing or memory resources), or a combination thereof. For example, operation of the system 100 in accordance with at least one of the stored rules 1002 may cause the epoch size to be set at 1000 during the first five epochs and to be set at 200 during the fifth-tenth epochs, which may improve the efficiency of the genetic algorithm 110 (e.g., the genetic algorithm 110 may converge faster than genetic algorithms having fixed epoch sizes). As another example, the number of active backpropagation trainers 180 may be set to zero in later epochs when a fitness metric (e.g., a highest fitness value, an average fitness value, etc.) satisfies a fitness threshold, which enables processing and memory resources used by the backpropagation trainers 180 to be reclaimed and made available (e.g., reallocated) for other operations of the system 100. Thus, the system 100 may have improved flexibility (e.g., processing and memory resources may be selectively reallocated from the backpropagation trainers 180), faster operating times (e.g., the genetic algorithm 110 may converge faster), and lower power consumption as compared to systems that do not operate in accordance with the stored rules 1002. It is to be understood that the specific rule examples illustrated in FIG. 10 and otherwise described herein are for illustrative purposes only and are not to be considered limiting. In alternative aspects, more, fewer, and/or different rules may be used in the system 100 to determine and adjust epoch size, number of active/instantiated/enabled optimization trainers, and number of trainable models provided for optimization training per epoch.

Operation at the system 100 may continue iteratively until specified a termination criterion, such as a time limit, a number of epochs, or a threshold fitness value (of an overall fittest model) is satisfied. When the termination criterion is satisfied, an overall fittest model of the last executed epoch may be selected and output as representing a neural network that best models the input data set 102. In some examples, the overall fittest model may undergo a final training operation (e.g., by the backpropagation trainer 180) before being output.

Although various aspects are described with reference to a backpropagation training, it is to be understood that in alternate implementations different types of training may also be used in the system 100. For example, models may be trained using a genetic algorithm training process. In this example, genetic operations similar to those described above are performed while all aspects of a model, except for the connection weight, are held constant.

Performing genetic operations may be less resource intensive than evaluating fitness of models and training of models using backpropagation. For example, both evaluating the fitness of a model and training a model include providing the input data set 102, or at least a portion thereof, to the model, calculating results of nodes and connections of a neural network to generate output data, and comparing the output data to the input data set 102 to determine the presence and/or magnitude of an error. In contrast, genetic operations do not operate on the input data set 102, but rather merely modify characteristics of one or more models. However, as described above, one iteration of the genetic algorithm 110 may include both genetic operations and evaluating the fitness of every model and species. Training trainable models generated by breeding the fittest models of an epoch may improve fitness of the trained models without requiring training of every model of an epoch. Further, the fitness of models of subsequent epochs may benefit from the improved fitness of the trained models due to genetic operations based on the trained models. Accordingly, training the fittest models enables generating a model with a particular error rate in fewer epochs than using genetic operations alone. As a result, fewer processing resources may be utilized in building highly accurate models based on a specified input data set 102.

The system 100 of FIG. 1 may thus support cooperative, data-driven execution of a genetic algorithm and a backpropagation trainer to automatically arrive at an output neural network model of an input data set. The system of FIG. 1 may arrive at the output neural network model faster than using a genetic algorithm or backpropagation alone and with reduced cost as compared to hiring a data scientist. In some cases, the neural network model output by the system 100 may also be more accurate than a model that would be generated by a genetic algorithm or backpropagation alone. The system 100 may also provide a problem-agnostic ability to generate neural networks. For example, the system 100 may represent a single automated model building framework that is capable of generating neural networks for at least regression problems, classification problems, and reinforcement learning problems. Further, the system 100 may enable generation of a generalized neural network that demonstrates improved adaptability to never-before-seen conditions. To illustrate, the neural network may mitigate or avoid overfitting to an input data set and instead may be more universal in nature. Thus, the neural networks generated by the system 100 may be capable of being deployed with fewer concerns about generating incorrect predictions.

It will be appreciated that the systems and methods of the present disclosure may be applicable in various scenarios, infrastructures, and data environments. As an illustrative non-limiting example, the input data set 102 may include timestamped data from a large array of sensors distributed around a wind farm and may also include timestamped uptime/downtime data of individual wind turbines. The system 100 may generate a neural network model that is configured to predict how likely a wind turbine is to fail. The neural network model may, in a particular example, increase failure lead time from 3-5 days to 30-40 days, which can result in reduced downtime and monetary savings for an operator of the wind farm. The system 100 may be capable of automatically building similar kinds of models that predict numerical values or states (e.g., failures) for internet of things (IoT), utilities, and oil/gas infrastructures.

As another illustrative non-limiting example, the input data set 102 may include health data and the system 100 may automatically build a model to predict whether a patient exhibiting certain health conditions is likely to have a particular ailment. As another illustrative non-limiting example, the input data set 102 may include financial data and the system 100 may automatically build a model to forecast market conditions. As another illustrative non-limiting example, the input data set 102 may include network security, network log, and/or malware data, and the system 100 may automatically build a model to implement firewall filtering rules, endpoint anti-malware detection, a bot/botnet detector, etc.

As another illustrative non-limiting example, the system 100 may generate a neural network to output aircraft autopilot operations (e.g. throttle, steer, flaps, etc.) based on reinforcement learning. In such an example, the reward function optimized by the neural network may involve aircraft altitude, aircraft distance traveled, etc. As yet another example, the system 100 may generate a neural network to predict oil/gas industry workover events (e.g., events that lead to major maintenance or remedial operations on a rig or well, which can lead to considerable production time lost and expense incurred).

Yet another example of a problem set that can be solved with neural networks generated with the system 100 described herein is data fusion. In this case, data aggregated from a large number of sensors of various types, including multiple sensors of the same type, is collected and used to identify an object, action or phenomenon that wouldn't be entirely detectable with any one sensor or with a small subset of sensors. For example, the detection of a submarine may be performed based on the inputs received from multiple sonar buoys which provide input to the generated neural network. Another example may be the identification of a particular type of aircraft based on both the audio signature and a visual view (which may be partially obscured or have a low resolution).

Figure 8A:
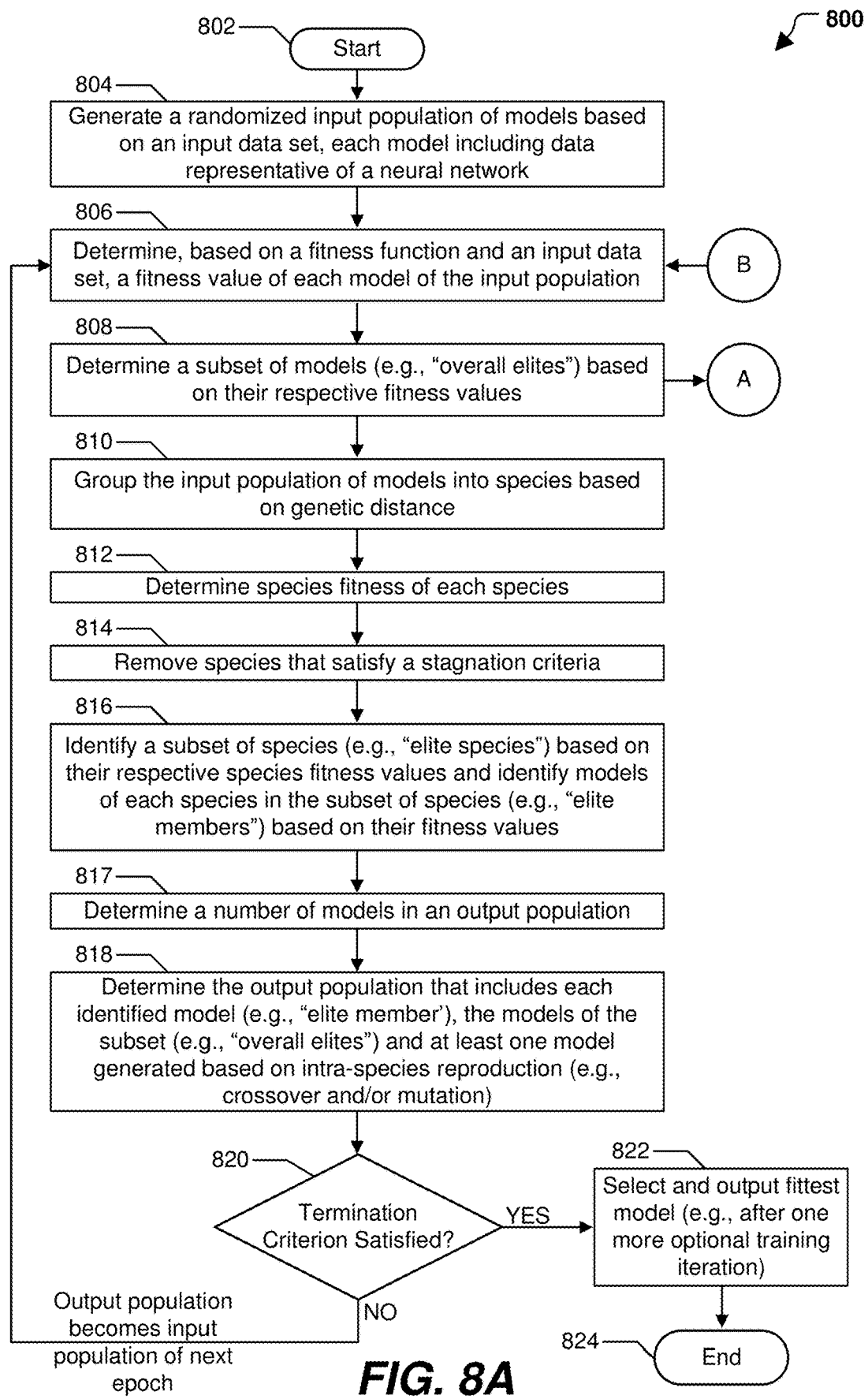
FIGS. 8A and 8B collectively illustrate a particular example of a method of cooperative execution of a genetic algorithm and a backpropagation trainer.
Figure 8B:
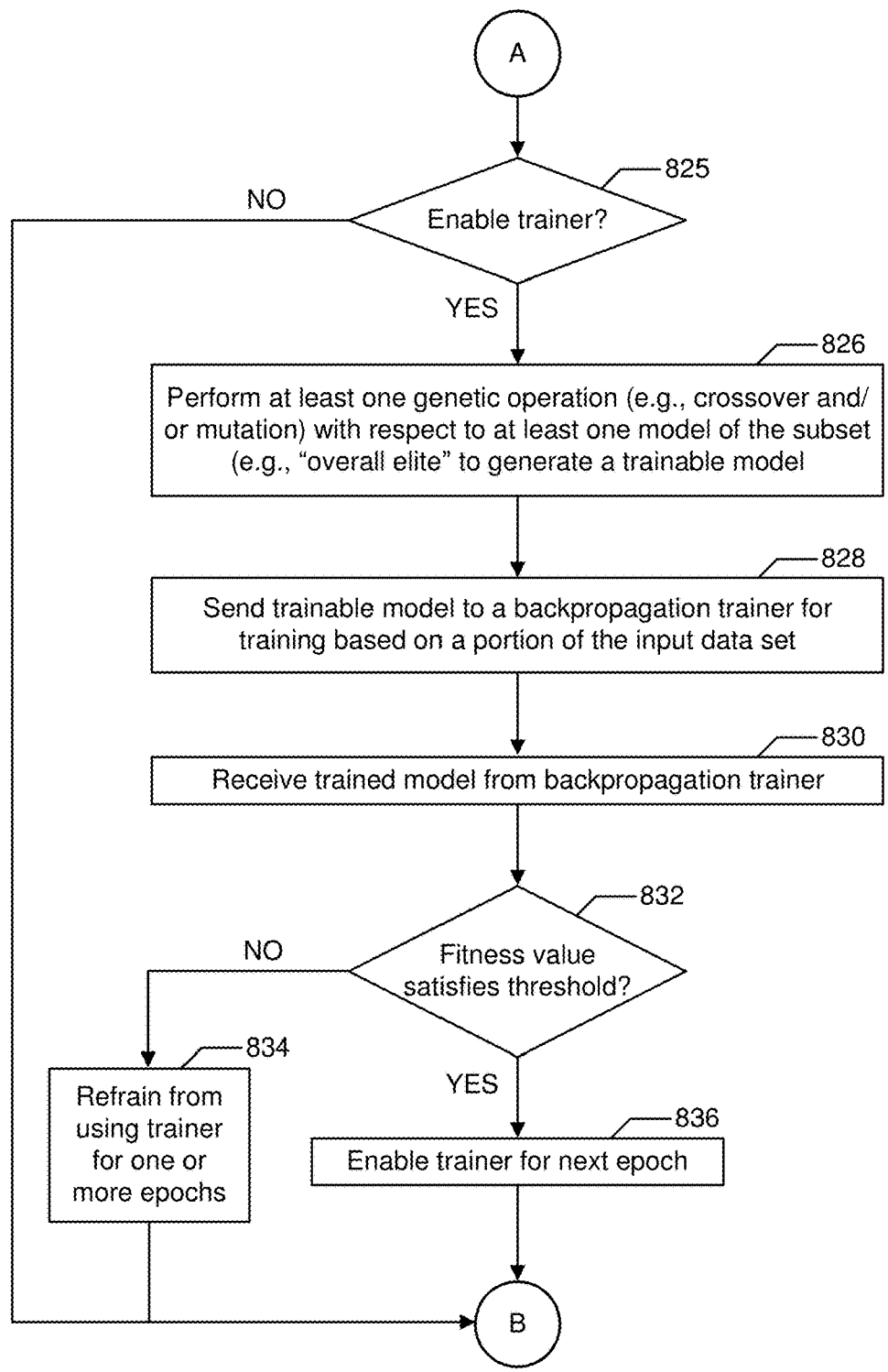

FIGS. 8A and 8B depict a particular example of a method 800 of cooperative execution of a genetic algorithm and a backpropagation trainer. In an illustrative example, the method 800 may be performed at the system 100 of FIG. 1.

The method 800 may start, at 802, and may include generating a randomized input population of models based on an input data set, at 804. Each model may include data representative of a neural network. For example, each model may include at least node data and connection data, as described with reference to FIGS. 1 and 2. Further, each of the models may be part of the input set 120 of FIG. 1 and may model the input data set 102 of FIG. 1.

The method 800 may also include determining, based on a fitness function, a fitness value of each model of the input population, at 806. For example, the fitness of each model of the input set 120 may be determined, as described with reference to FIGS. 1 and 3.

The method 800 may further include determining a subset of models based on their respective fitness values, at 808. The subset of models may be the fittest models of the input population, e.g., "overall elites." For example, "overall elites" may be determined as described with reference to FIGS. 1 and 4.

The method 800 may include performing multiple sets of operations at least partially concurrently. Continuing to 825 (in FIG. 8B), the method 800 may include determining whether to enable a backpropagation trainer. For example, the backpropagation trainer 180 may be enabled based on a fitness value associated with the trained model 182 generated by the backpropagation trainer 180 during a prior epoch satisfying a threshold, as further described with reference to FIG. 7. As another example, the backpropagation trainer 180 may be enabled based on an epoch number associated with the current epoch. To illustrate, the backpropagation trainer 180 may be enabled during particular epochs, and the epoch number of the current epoch may be compared to epoch numbers of the particular epochs to determine whether to enable the backpropagation trainer 180. If the backpropagation trainer is not enabled, the genetic algorithm continues, as further described herein.

If the backpropagation trainer is enabled, the method 800 continues to 826, which may include performing at least one genetic operation with respect to at least one model of the subset to generate a trainable model. For example, the crossover operation 160 and/or the mutation operation 170 may be performed with respect to the "overall elites" to generate the trainable model 122, as described with reference to FIGS. 1, 4, and 5.

The method 800 may also include sending the trainable model to a backpropagation trainer (or other optimization trainer) for training based on a portion of the input data set, at 828. For example, the backpropagation trainer 180 of FIG. 1 may train the trainable model 122 based on a portion of the input data set 102 to generate the trained model 182, as described with reference to FIGS. 1 and 5.

The method 800 may include receiving the trained model from the backpropagation trainer, at 830. For example, the backpropagation trainer 180 may output the trained model 182 after training the trainable model 122. The method 800 may also include determining whether a fitness value associated with the trained model satisfies a threshold, at 832. For example, a fitness value may be determined by applying the fitness function 140 to the trained model 182, and the fitness value may be compared to a threshold. The threshold may indicate a minimum value associated with enabling the backpropagation trainer 180 for one or more subsequent epochs, as described with reference to FIG. 7. If the fitness value satisfies the threshold, the backpropagation trainer is enabled for the next epoch, at 836. For example, a bit, a flag, etc., may be set to indicate that the backpropagation trainer 180 is to be enabled (or remain enabled) during the next epoch. In a particular implementation, the backpropagation trainer 180 is enabled for a single epoch. Alternatively, the backpropagation trainer 180 may be enabled for a particular number of epochs. If the fitness value fails to satisfy the threshold, the backpropagation trainer is not used (e.g., is disabled) for one or more epochs, at 834. For example, the trainable model 122 may not be generated and provided to the backpropagation trainer 180 for a particular number of epochs, thereby disabling the backpropagation trainer 180 for the particular number of epochs, as described with reference to FIG. 7.

The genetic algorithm may continue while backpropagation training occurs. For example, the method 800 may include grouping the input population of models into species based on genetic distance, at 810, and determining species fitness of each species, at 812. To illustrate, the models of the input set 120 may be grouped into species and species fitness may be evaluated as described with reference to FIGS. 1, 3, and 4.

Continuing to 814, species that satisfy a stagnation criterion may be removed. For example, species satisfying the stagnation criterion 150 may be removed, as described with reference to FIGS. 1 and 4. At 816, the method 800 may include identifying a subset of species based on their respective fitness values and identifying models of each species in the subset based on their respective model fitness values. The subset of species may be the fittest species of the input population, e.g., "elite species," and the identified models of the "elite species" may be the fittest members of those species, e.g., "elite members." For example, species fitness values, "elite species," and "elite members" may be determined as described with reference to FIGS. 1 and 4.

The method 800 may include determining a number of models in an output population, at 817. As an example, the number of models in the output set 130 may be determined based on an epoch number associated with the current epoch, as described with reference to FIG. 7. As another example, the number of models in the output set 130 may be determined based on one or more metrics associated with at least one prior epoch, as further described with reference to FIG. 7.

The method 800 may include determining the output population that includes each "elite member," the "overall elites," and at least one model that is generated based on intra-species reproduction, at 818. For example, the models of the output set 130 of FIG. 1 may be determined, where the output set 130 includes the overall elite models 460-464, the elite members (including the elite member model 470), and at least one model generated based on intra-species reproduction using the crossover operation 160 and/or the mutation operation 170, as described with reference to FIGS. 1 and 6.

The method 800 may include determining whether a termination criterion is satisfied, at 820. The termination criterion may include a time limit, a number of epochs, or a threshold fitness value of an overall fittest model, as illustrative non-limiting examples. If the termination criterion is not satisfied, the method 800 returns to 806 and a next epoch of the genetic algorithm is executed, where the output population determined at 818 is the input population of the next epoch.

As described above, while the genetic algorithm is ongoing, the backpropagation trainer may train the trainable model to generate a trained model. When training is complete, the method 800 may include receiving the trained model from the backpropagation trainer (or other optimization trainer), at 830 (in FIG. 8B). The trained model may be added to the input set of an epoch of the genetic algorithm, as shown in FIG. 8B.

When the termination criterion is satisfied, at 820, the method 800 may include selecting and outputting a fittest model, at 822, and the method 800 may end, at 824. In some implementations, the selected model may be subjected to a final training operation, e.g., by the backpropagation trainer or by another trainer, before being output.

FIG. 9 depicts a particular example of a method 900 of execution of a genetic algorithm with variable epoch sizes. In an illustrative example, the method 900 may be performed at the system 100 of FIG. 1.

The method 900 includes generating, by a processor of a computing device, a first plurality of models based on a genetic algorithm and corresponding to a first epoch of the genetic algorithm, at 902. Each of the first plurality of models includes data representative of a neural network and the first plurality of models includes a first number of models. For example, during the first epoch of the genetic algorithm 110, the output set 130 may be generated, as described with reference to FIG. 1. For the first epoch, the output set 130 may include a first number (N) of models. Each of the models of the output set 130 include data representative of neural network. In a particular implementation, the data representative of the neural network includes node data corresponding to a plurality of nodes of the neural network, connection data corresponding to one or more connections of the neural network, or any combination thereof. For example, the models of the input set 120 and/or the output set 130 may include the node data 210, the connection data 220, or both, as described with reference to FIG. 2.

The method 900 includes determining whether to modify an epoch size during a second epoch of the genetic algorithm based on a convergence metric associated with at least one epoch that is prior to the second epoch, at 904. The second epoch is subsequent to the first epoch. For example, an epoch size of the second epoch may be increased (as compared to a previous epoch size) if the convergence metric 142 satisfies one or more thresholds, or the epoch size of the second epoch may be decreased (as compared to the previous epoch size) if the convergence metric 142 fails to satisfy one or more thresholds. As a particular example, the epoch size may be decreased if an improvement metric associated with at least one prior epoch satisfies an improvement threshold, as described with reference to FIG. 1. As another example, the epoch size may be increased if a stagnation metric associated with at least one prior epoch satisfies a stagnation threshold, as described with reference to FIG. 7. In other examples, other convergence metrics may be used to determine whether to modify the epoch size for a particular epoch.

The method 900 further includes, based on a determination to modify the epoch size, generating a second plurality of models based on the genetic algorithm and corresponding to the second epoch, at 906. Each of the second plurality of models includes data representative of a neural network and the second plurality of models includes a second number of models that is different than the first number. For example, during the second epoch of the genetic algorithm 110, the output set 130 may be generated, as described with reference to FIG. 1. For the second epoch, the output set 130 may include a second number (M) of models. N and M may be different positive integers. In a particular implementation, the second number is less than the first number (e.g., M<N). In an alternate implementation, the second number is greater than the first number (e.g., M>N). Thus, during the second epoch of the genetic algorithm 110, the output set 130 may have a different size than during the first epoch. The first epoch and the second epoch may be consecutive epochs or the first epoch and the second epoch may be separated by at least one epoch (and the output set 130 may include N, M, or a different number of models during the at least one epoch). Although referred to as the "first" and "second" epochs, such terminology is for convenience and is not to be considered limiting. The first and second epochs may be any epochs of the genetic algorithm such that the second epoch is subsequent to the first epoch. As an example, the first epoch may be the initial epoch of the genetic algorithm, and the second epoch be the next consecutive epoch or a different epoch. As another example, the first epoch may be a non-initial epoch of the genetic algorithm, and the second epoch may be the next consecutive epoch or a different epoch.

In a particular implementation, convergence metric may include a fitness value corresponding to the at least one epoch or to at least one model of the at least one epoch, an improvement metric corresponding to the at least one epoch or to at least one model of the at least one epoch, a stagnation metric corresponding to the at least one epoch, or any combination thereof. As a particular example, the number of models generated during the second epoch of the genetic algorithm 110 may be reduced as compared to the number of models generated during the first epoch (e.g., the epoch size may be reduced) based on a fitness value, such as an average fitness value, a maximum fitness value, a median fitness value, a most common fitness value, or another fitness value, associated with at least one model of the first epoch (or at least one model of one or more other epochs between the first epoch and the second epoch) satisfying a fitness threshold. As another particular example, the number of models generated during the second epoch of the genetic algorithm 110 may be increased as compared to the number of models generated during the first epoch (e.g., the epoch size may be increased) based on an improvement metric failing to satisfy a threshold. As yet another particular example, the number of models generated during the second epoch of the genetic algorithm 110 may be increased as compared to the number of models generated during the first epoch based on a stagnation metric satisfying a threshold. The number of models generated during the second epoch may be determined in other ways, as further described with reference to FIG. 7.

In another particular implementation, the convergence metric includes an epoch number associated with the at least one epoch. For example, if the epoch number of a particular epoch of the genetic algorithm 110 is within a first range, the first number of models may be generated during the particular epoch, and if the epoch number is within a second range, the second number of models may be generated during the particular epoch (e.g., the epoch size is modified from the first number to the second number), as described with reference to FIG. 7.

In another particular implementation, method 900 includes providing a trainable model to an optimization trainer and adding a trained model received from the optimization trainer as input to a third epoch of the genetic algorithm that is subsequent to the second epoch. For example, the trainable model 122 may be generated and provided to the backpropagation trainer 180, as described with reference to FIGS. 1 and 4-6. The backpropagation trainer 180 may generate the trained model 182, and the trained model 182 may be provided as part of the input set 120 to the third epoch of the genetic algorithm 110, as described with reference to FIGS. 1 and 7. The second epoch and the third epoch may be consecutive epochs (e.g., the backpropagation trainer 180 may generate the trained model 182 during a single epoch) or the second epoch and the third epoch may be separated by at least one epoch (e.g., the backpropagation trainer 180 may generate the trained model 182 over multiple epochs). In other implementations, the optimization trainer may include other types of trainers, such as a DFO trainer or an ELM, as non-limiting examples.

The trainable model may be determined based on modifying one or more models of the second plurality of models. In a particular implementation, modifying the one or more models of the second plurality of models includes performing at least one of a crossover operation or a mutation operation with respect to the one or more models of the second plurality of models. For example, at least one of the crossover operation 160 or the mutation operation 170 may be performed on one or more models, which may include the "elite member" models of "elite species" (e.g., the model 470) or the "overall elite" models (e.g., the models 460, 462, and 464), as described with reference to FIGS. 4-6. Additionally or alternatively, the optimization trainer may be configured to update connection weights of the trainable model but not a topology or activation functions of the trainable model. For example, during training, the backpropagation trainer 180 may update the connection weights of the trainable model 122 while leaving other aspects (e.g., neural network topology, activation functions, etc.) unchanged, as described with reference to FIG. 1.

The method 900 may further include determining a fitness value associated with the trained model and providing a second trainable model to the optimization trainer based on the fitness value satisfying a threshold. The second trainable model may be determined based on modifying one or more models of a third plurality of models generated based on the genetic algorithm and corresponding to the third epoch. For example, the fitness function 140 may be applied to the trained model 182 to generate a fitness value, and based on the fitness value satisfying a first threshold, the second trainable model 710 may be generated and provided to the backpropagation trainer 180 during the Kth epoch, as described with reference to FIG. 7. The fitness value associated with the trained model may be determined based on a fitness function that is evaluated based on an input data set associated with the genetic algorithm. For example, the fitness value may be determined by applying the fitness function 140 that is evaluated based on the input data set 102 associated with the genetic algorithm 110, as described with reference to FIG. 1. The method 900 may further include providing a third trainable model to the optimization trainer based on the fitness value satisfying a second threshold. The third trainable model may be determined based on modifying one or more models of the third plurality of models. For example, if the fitness value satisfies the first threshold and a second threshold, one or more additional trainable models may be generated and provided to the backpropagation trainer 180 during the third epoch, as described with reference to FIG. 7.

Additionally or alternatively, the method 900 may further include determining a fitness value associated with the trained model and refraining from providing any trainable models to the optimization trainer for at least one epoch based on the fitness value failing to satisfy a threshold. For example, the fitness function 140 may be applied to the trained model 182 to generate a fitness value, and based on the fitness value failing to satisfy a first threshold, trainable models may not be generated and provided to the backpropagation trainer 180 for a particular number of epochs. The particular number may be any integer greater than zero. The method 900 may further include providing a second trainable model to the optimization trainer. The second trainable model may be based on identifying one or more models of a third plurality of models generated based on the genetic algorithm and corresponding to a fourth epoch of the genetic algorithm that is subsequent to the third epoch, and the third epoch and the fourth epoch may be separated by at least one epoch. For example, the second trainable model 710 may be generated and provided to the backpropagation trainer 180 during the Lth epoch if the fitness value determined during the Kth epoch fails to satisfy the first threshold, as described with reference to FIG. 7.

Thus, the method 900 enables generation of different numbers of models during different epochs of the genetic algorithm. Changing the number of models generated during different epochs (e.g., based on epoch number or based on metrics) may enable the genetic algorithm to generate more models at times when increasing the number of models that are analyzed is more likely to result in genetic traits that will lead to convergence of the genetic algorithm. For example, during early epochs (e.g., when the models have relatively simple topologies) or when epoch-to-epoch improvement is low (e.g., when the outputs of an epoch become stagnant), generating and analyzing a larger number of models may be more effective than tuning already identified models. Additionally, the genetic algorithm may reduce the number of models generated at other times to when generating additional models may not significantly improve the output of one or more epochs. For example, during later epochs (e.g., when models have relatively more complex topologies) and during epochs where the epoch-to-epoch improvement is acceptably high, the number of models generated may be reduced to focus the genetic algorithm on tuning one or more models having higher accuracy than other models). Varying the sizes of the input sets and/or the output sets of different epochs in this manner may reduce the amount of time (e.g., the number of epochs) that the genetic algorithm takes to converge upon an acceptable result, as compared to maintaining the size of the input set and/or the output set during all epochs. Additionally, in some implementations, the method 900 selectively enables optimization training (e.g., based on a fitness value of a previous trained model). By enabling optimization training in certain situations, the method 900 may result in reduced usage of processing resources and reduced power consumption as compared to methods that always enable optimization training. Thus, in at least some implementations, the method 900 improves overall efficiency by enabling optimization training in situations in which the optimization training generates sufficiently improved results (e.g., when the fitness value satisfies the threshold) and by disabling the optimization training in situations in which in which the optimization training does not generate sufficiently improved results (e.g., when the fitness value fails to satisfy the threshold) in order to conserve processing resources and reduce power consumption.

It is to be understood that the division and ordering of steps in FIGS. 8A, 8B, and 9 is for illustrative purposes only and should not be considered limiting. In alternative implementations, certain steps may be combined and other steps may be subdivided into multiple steps. Moreover, the ordering of steps may change. For example, the termination criterion may be evaluated after determining the "overall elites," at 808, rather than after determining the output population, at 818.

In conjunction with the described aspects, a computer system may include a memory configured to store an input data set. The system also includes a processor configured to execute a recursive search. Executing the recursive search includes generating a first plurality of data structures during a first iteration of the recursive search, generating a second plurality of data structures based on at least one of the first plurality of data structures during a second iteration of the recursive search, and providing a trainable data structure to an optimization trainer. The second iteration is subsequent to the first iteration. Each of the first plurality of data structures and the second plurality of data structures includes data representative of a neural network. The first plurality of data structures includes a first number of data structures and the second plurality of data structures includes a second number of data structures. The second number is different than the first number. The trainable data structure is determined based on modifying one or more data structures of the second plurality of data structures. The optimization trainer is configured to train the trainable data structure based on a portion of the input data set to generate a trained data structure and to provide the trained data structure as input to a third iteration of the recursive search that is subsequent to the second iteration.

In conjunction with the described aspects, a method includes generating, by a processor of a computing device, a first plurality of models based on a genetic algorithm and corresponding to a first epoch of the genetic algorithm. Each of the first plurality of models includes data representative of a neural network and the first plurality of models includes a first number of models. The method also includes determining whether to modify an epoch size during a second epoch of the genetic algorithm based on a convergence metric associated with at least one epoch that is prior to the second epoch. The second epoch is subsequent to the first epoch. The method further includes, based on a determination to modify the epoch size, generating a second plurality of models based on the genetic algorithm and corresponding to the second epoch of the genetic algorithm. Each of the second plurality of models includes data representative of a neural network and the second plurality of models includes a second number of models. The second number is different than the first number.

In conjunction with the described aspects, a computer-readable storage device stores instructions that, when executed, cause a computer to perform operations including determining a trainable model to provide to a trainer. The trainable model is determined based on modification of one or more models of a first plurality of models that is generated based on a genetic algorithm and corresponding to a first epoch of the genetic algorithm. Each of the first plurality of models includes data representative of a neural network. The operations also include providing the trainable model to the trainer adding a trained model received from the trainer as input to a second epoch of the genetic algorithm that is subsequent to the first epoch. The operations include determining whether to enable the trainer, disable the trainer, or activate at least one additional trainer for a third epoch of the genetic algorithm based on a convergence metric that is associated with at least one epoch prior to the third epoch or the trained model. The third epoch is subsequent to the second epoch. The operations further include generating an output of the genetic algorithm based at least in part on one or more characteristics of one or more models of the third epoch or based on modifying one or more characteristics of the one or more models of the third epoch. In a particular implementation, the operations also include determining the convergence metric based on evaluation of a fitness function based on an input set associated with the genetic algorithm and the trained model, responsive to determining to enable the trainer, generating and providing a second trainable model to the trainer, and adding a second trained model received from the trainer as an input to a third epoch of the genetic algorithm that is subsequent to the second epoch. In another particular implementation, the operations further include, during the third epoch, determining whether to modify an epoch size based on a second convergence metric corresponding to at least one epoch prior to the third epoch or at least one model of the at least one epoch.

In conjunction with the described aspects, a computer system may include a memory configured to store an input data set. The system also includes a processor configured to execute a recursive search. Executing the recursive search includes determining a trainable data structure to provide to an optimization trainer and providing the trainable data structure to the optimization trainer. The trainable data structure is determined based on modifying one or more data structures of a first plurality of data structures that is generated during a first iteration of the recursive search. Each of the first plurality of data structures includes data representative of a neural network. The optimization trainer is configured to train the trainable data structure based on a portion of the input data set to generate a trained data structure and to provide the trained data structure as input to a second iteration of the recursive search that is subsequent to the first iteration. Executing the recursive search also includes determining whether to enable the optimization trainer, disable the optimization trainer, or activate at least one additional optimization trainer during a third iteration of the recursive search based on a convergence metric that is associated with at least iteration prior to the third iteration or the trained data structure. The third iteration is subsequent to the second iteration. Executing the recursive search further comprises generating an output of the recursive search based at least in part on one or more characteristics of one or more data structures corresponding to the third iteration or based on modifying one or more characteristics of the one or more data structures corresponding to the third iteration.

In conjunction with the described aspects, a method includes determining a trainable model to provide to a trainer. The trainable model is determined based on modification of one or more models of a first plurality of models that is generated based on a genetic algorithm and corresponding to a first epoch of the genetic algorithm. Each of the first plurality of models includes data representative of a neural network. The method also includes providing the trainable model to the trainer and adding a trained model received from the trainer as input to a second epoch of the genetic algorithm that is subsequent to the first epoch. The method also includes determining whether to enable the trainer, disable the trainer, or activate at least one additional trainer for a third epoch of the genetic algorithm based on a convergence metric that is associated with at least one epoch prior to the third epoch or the trained model. The third epoch is subsequent to the second epoch. The method further includes generating an output of the genetic algorithm based at least in part on one or more characteristics of one or more models of the third epoch or based on modifying one or more characteristics of the one or more models of the third epoch.

In conjunction with the described aspects, a computer-readable storage device stores instructions that, when executed, cause a computer to perform operations including generating, by a processor of a computing device, a first plurality of models based on a genetic algorithm and corresponding to a first epoch of the genetic algorithm. Each of the first plurality of models includes data representative of a neural network and the first plurality of models includes a first number of models. The operations also include determining whether to modify an epoch size during a second epoch of the genetic algorithm based on a convergence metric associated with at least one epoch that is prior to the second epoch. The second epoch is subsequent to the first epoch. The operations further include, based on a determination to modify the epoch size, generating a second plurality of models based on the genetic algorithm and corresponding to the second epoch. Each of the second plurality of models includes data representative of a neural network and the second plurality of models includes a second number of models. The second number is different than the first number.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving a trained model from a trainer, the trained model representing a trained version of a first model of a plurality of models of a first epoch of a genetic algorithm, wherein each of the plurality of models includes data representative of a neural network;
generating an input set of models for a second epoch of the genetic algorithm, the input set of models including the trained model and a second model of the plurality of models of the first epoch, wherein the second epoch is subsequent to the first epoch, and wherein the second model is not trained between the first epoch and the second epoch; and
generating, after the second epoch of the genetic algorithm, an output set of models, the output set of models based at least in part on modifying one or more characteristics of the input set of models of the second epoch.

2. The method of claim 1, further comprising selecting, based on one or more rules, the input set of models for the second epoch from among one or more trained models and one or more untrained models.

3. The method of claim 1, further comprising, after the first epoch, determining to disable the trainer based on a convergence metric, wherein the second model is not trained between the first epoch and the second epoch based on the determination to disable the trainer.

4. The method of claim 1, further comprising, after the first epoch, determining, based on one or more rules, a size of the input set of models for the second epoch, wherein the input set of models for the second epoch has a count of models based on the determined size of the input set.

5. The method of claim 1, wherein an input set for the first epoch includes a first count of models and the input set for the second epoch includes a second count of models, the second count different from the first count.

6. The method of claim 1, further comprising determining a fitness value associated with the trained model, wherein the second model is not trained based on the fitness value failing to satisfy a threshold.

7. The method of claim 1, further comprising, after the second epoch, performing a third epoch of the genetic algorithm, wherein the third epoch includes providing one or more models to the trainer, wherein the output set of models is based at least in part on one or more models of the third epoch.

8. The method of claim 7, further comprising performing one or more epochs of the genetic algorithm between the second epoch and the third epoch.

9. The method of claim 1, wherein the trainer is executed on a different device, graphics processing unit (GPU), processor, core, thread, or any combination thereof, than the genetic algorithm.

10. A computer-readable storage device storing instructions that, when executed, cause a computer to perform operations comprising:
receiving a trained model from a trainer, the trained model representing a trained version of a first model of a plurality of models of a first epoch of a genetic algorithm, wherein each of the plurality of models includes data representative of a neural network;
generating an input set of models for a second epoch of the genetic algorithm, the input set of models including the trained model and a second model of the plurality of models of the first epoch, wherein the second epoch is subsequent to the first epoch, and wherein the second model is not trained between the first epoch and the second epoch; and generating, after the second epoch of the genetic algorithm, an output set of models, the output set of models based at least in part on modifying one or more characteristics of the input set of models of the second epoch.

11. A method comprising:

generating, via one or more first iterations of a recursive search, a first plurality of models, wherein each of the one or more first iterations includes one or more genetic operations and one or more training operations, and wherein each of the first plurality of models includes data representative of a neural network; and after generating the first plurality of models, performing one or more second iterations of the recursive search, wherein each of the one or more second iterations includes one or more genetic operations and does not include training operations.

12. The method of claim 11, further comprising, after performing the one or more second iterations of the recursive search, generating, via one or more third iterations of the recursive search, a third plurality of models, wherein each of the one or more third iterations includes one or more genetic operations and one or more training operations.

13. The method of claim 11, further comprising determining to omit training operations from the one or more second iterations based on a convergence metric.

14. The method of claim 11, further comprising, after the one or more first iterations, determining, based on one or more rules, a size of an input set of models for at least one of the one or more second iterations, wherein the size of the input set of models indicates a count of models input to the at least one of the one or more second iterations.

15. The method of claim 11, wherein an input set of models for the one or more first iterations includes a first count of models and an input set of models for the one or more second iterations includes a second count of models, the second count different from the first count.

16. The method of claim 11, wherein the data representative of the neural network includes node data corresponding to a plurality of nodes of the neural network, connection data corresponding to one or more connections of the neural network, or any combination thereof.

17. A computer-readable storage device storing instructions that, when executed, cause a computer to perform operations comprising:

generating, via one or more first iterations of a recursive search, a first plurality of models, wherein each of the one or more first iterations includes one or more genetic operations and one or more training operations, and wherein each of the first plurality of models includes data representative of a neural network; and after generating the first plurality of models, performing one or more second iterations of the recursive search, wherein each of the one or more second iterations includes one or more genetic operations and does not include training operations.

18. A method comprising:

generating, via one or more first iterations of a recursive search, a first plurality of models, wherein:

each of the one or more first iterations includes one or more genetic operations and one or more training operations;

each of the first plurality of models includes data representative of a neural network; and a second iteration of the recursive search includes one or more genetic operations and does not include training operations;

determining, based on one or more rules, a size of an input set of models for the second iteration of the recursive search;

generating the input set of models for the second iteration of the recursive search, the input set of models having a count of models based on the determined size of the input set; and generating an output set of models based at least in part on modifying one or more characteristics of the input set of models of the second iteration.

19. The method of claim 18, further comprising after a particular iteration, determining a value of a convergence metric, wherein the one or more rules are based on the value of the convergence metric, and wherein the particular iteration is prior to the second iteration.

20. The method of claim 19, wherein the convergence metric is determined based on a fitness value corresponding to the particular iteration or to at least one model of the particular iteration, an improvement metric corresponding to the particular iteration or to at least one model of the particular iteration, a stagnation metric corresponding to the particular iteration, or any combination thereof.

21. The method of claim 18, further comprising after a particular iteration:

determining a fitness value associated with an output model of the output set of models; and providing a trainable model to a trainer based on the fitness value satisfying a threshold.

22. The method of claim 18, modifying the one or more characteristics of the input set of models of the second iteration includes performing at least one of a crossover operation or a mutation operation.

23. A computer-readable storage device storing instructions that, when executed, cause a computer to perform operations comprising:

generating, via one or more first iterations of a recursive search, a first plurality of models, wherein:

each of the one or more first iterations includes one or more genetic operations and one or more training operations;

each of the first plurality of models includes data representative of a neural network; and a second iteration of the recursive search includes one or more genetic operations and does not include training operations;

determining, based on one or more rules, a size of an input set of models for the second iteration of the recursive search;

generating the input set of models for the second iteration of the recursive search, the input set of models having a count of models based on the determined size of the input set; and generating an output set of models based at least in part on modifying one or more characteristics of the input set of models of the second iteration.

* * * * *